United States Patent
Fuchs et al.

(10) Patent No.: US 7,103,854 B2
(45) Date of Patent: Sep. 5, 2006

(54) SYSTEM AND METHOD FOR ASSOCIATING TEXT AND GRAPHICAL VIEWS OF MAP INFORMATION

(75) Inventors: Gil Fuchs, Menlo Park, CA (US); Darrell Mathis, Hillsborough, CA (US)

(73) Assignee: Tele Atlas North America, Inc., Menlo Park, CA (US)

( * ) Notice: Subject to any disclaimer, the term of this patent is extended or adjusted under 35 U.S.C. 154(b) by 0 days.

(21) Appl. No.: 10/209,750

(22) Filed: Jul. 31, 2002

(65) Prior Publication Data

US 2004/0001114 A1 Jan. 1, 2004

Related U.S. Application Data

(60) Provisional application No. 60/392,742, filed on Jun. 27, 2002.

(51) Int. Cl.
*G06F 3/00* (2006.01)
(52) U.S. Cl. ............... 715/855; 715/804; 715/781; 715/968
(58) Field of Classification Search ........... 345/700, 345/712–713, 734, 736–738, 850–855, 805; 715/700, 712, 713, 734, 736–738, 850–855, 715/833, 804, 781, 968
See application file for complete search history.

(56) References Cited

U.S. PATENT DOCUMENTS 5,790,121 A * 8/1998 Sklar et al. ............... 345/853
5,897,619 A * 4/1999 Hargrove et al. ............ 705/4
6,005,679 A * 12/1999 Haneda ..................... 358/453
6,459,442 B1 * 10/2002 Edwards et al. ........... 345/863
6,580,441 B1 * 6/2003 Schileru-Key ............ 345/805
2002/0070981 A1 * 6/2002 Kida ........................ 345/833
2002/0163547 A1 * 11/2002 Abramson et al. ........ 345/855

OTHER PUBLICATIONS http://infomesh.net/2001/swintro/, 2001.*
Agnes Voisard, "Geologic Hypermaps are more than Clickable Maps!", Proceedings of the 6th ACM international symposium on Advances in geographic information systems, Nov. 1998, ACM Digital Library, pp. 1-6.*

* cited by examiner

*Primary Examiner*—Sy D. Luu
(74) *Attorney, Agent, or Firm*—Fliesler Meyer LLP.

(57) ABSTRACT

A system and method for manipulating digital map information, that allows the operator to view or modify map object or item attributes from either a graphical window or a text window. In one embodiment, when the user selects a map item within the graphical window (202), the text window (210) displays a text record that includes attributes (242) associated with the currently selected item. Attributes may include, for example, a street name, or a relationship of the current item to another item. The system can display these relationships within the text window. In one embodiment, the attributes that include links to related map items or to related items of information are highlighted or are visibly identified (249) in some manner. The operator can then select a highlighted attribute to traverse to, and display the new map item. The graphical window display can be updated in parallel with the text window.

29 Claims, 20 Drawing Sheets

```
Face Record [FACEREC]           _ □ X
    REC_DESCR      29
    FACE_ID        290
    NUM_EDGE       4
  · EDGE_ID        182
    ORIENT         1
  · EDGE_ID        166
    ORIENT         0
  · EDGE_ID        227
    ORIENT         0
  · EDGE_ID        237
    ORIENT         1

[ Prev ]  [ Next ]

REC_DESCR
```

FIGURE 14

| Edge Record [NEDGEREC] | |
|---|---|
| REC_DESCR | 24 |
| EDGE_ID | 182 |
| XYZ_ID | 0 |
| FKNOT_ID | 56 |
| TKNOT_ID | 74 |
| FACE_ID | 280 |
| AFACE_ID | 282 |
| STATUS | 2 |

FIGURE 16

SYSTEM AND METHOD FOR ASSOCIATING TEXT AND GRAPHICAL VIEWS OF MAP INFORMATION

CLAIM OF PRIORITY

This application claims priority from provisional application "SYSTEM AND METHOD FOR ASSOCIATING TEXT AND GRAPHICAL VIEWS OF MAP INFORMATION," Application No. 60/392,742, filed Jun. 27, 2002, and which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention is related to systems for displaying and editing digital maps, and particularly to a system and method for displaying both graphical and textual information about a map in a linked or associated manner.

BACKGROUND

The use of digital geographic or map data has become commonplace in today's modern, computerized society. Commonly referred to as electronic maps, digital maps, digitized maps, or simply as maps, this geographic or map data can be used in a wide variety of applications. A typical application is in the travel industry, whereby digital maps are used to quickly and automatically chart travel routes, and to locate destinations. Digital maps have found a particularly common everyday use in automobiles, wherein Global Positioning Systems (GPS) are used in association with a digital map to automatically track the position of a car and display the position on a map, for instance to guide the driver to a particular destination.

Digital maps are often also used in commercial environments, for example in calculating optimized routes for delivery drivers to take when performing deliveries, or for providing accurate directions for emergency and medical crews to follow when responding to emergency calls. For many years, the electronic map industry has also supplied maps to the military for use in military applications. Digital maps find a use in all aspects of industry, including for ground-based, maritime, and aviation purposes. As people become more familiar in carrying handheld electronic and Personal Digital Assistant (PDA) devices, increasingly distributed together with electronic maps stored therein, the electronic or digital map industry has grown to infiltrate every aspect of society.

One of the great benefits of a digital map over a traditional paper-based map is it's inherent flexibility and ability to portray large amounts of data. Paper maps are necessarily limited to the amount and type of information they can portray, within the constraints of their physical formats. Paper maps are obviously also difficult to update. Digital maps don't suffer from these problems. While earlier digital maps may have seemed merely like a scanned version of the paper product, today's modern digital maps are much more powerful. Objects can be included in the map and either displayed, or not displayed, depending on the wishes of the operator. The whole product can be quickly updated to reflect changes or corrections to all or just a small subset of map objects.

FIG. 1 shows a typical example of how a digital map is used by a software application to provide map and direction information to an operator. As shown in FIG. 1, a computer screen 100 under control of the operator or user can be used to display a graphical window 102, and thereon a digital version of the map 104, i.e. a digital map. The operator may select any object or item within the map to find out information that item. A second window 106 can be used to provide map or object information. Information about the map and the items contained therein can be used to provide, for example, driving directions 108 to the operator from a first location to a second location. Digital maps now play an important role in everyday activities such as trip planning.

However, along with this increased usage and functionality or electronic maps, the need has arisen to insure that these electronic maps are provided in such a way that they are flexible enough to allow for changes in the geography or in the political use of the underlying geographical area. For example, in urban areas the location and usage of surface streets may change on a regular basis. Schools and other important public buildings can be built seemingly almost overnight. An electronic map that is several years old (or in some cases even several months old) is of lesser use in such an environment, because the image the map displays, and the information it provides, is no longer reliably related to the underlying geography. As such, electronic map vendors continuously seek new ways in which they can regularly update and check the accuracy of their electronic maps, and do so in an easy manner such that the map need not be created from scratch each time, but can instead be updated or derived from previous versions of the map to reflect the new geography. Such a process is akin to the debugging process familiar to software application developers who must strive to fix problems and errors in their underlying software code.

While the application software industry has developed many tools for debugging software applications, current methods of debugging electronic or digital maps are often tedious and labor intensive. Typically they require the operator to retrieve a text version of the map information, sift through large amounts of textual data defining the map items within the map, and then modify the entries therein to reflect changes in the map itself. Since an electronic map is usually defined by a series of entries wherein each entry indicates, for example, a street, a public building, or a park, etc., the operator can modify the location and/or the properties of this entry by making edits to the text entry for that record.

The problems associated with these traditional methods of maintaining and updating electronic map information are that they are time consuming, and sometimes result in inaccuracies. The operator must be highly proficient in editing that particular map format. In addition, the person editing the textual record for a particular map entity may not be able to actually view the map on their screen. Instead they usually work from a text-only list that has been prepared by somebody else who previously inspected the visual map display, noted any errors, and created a Quality Assurance (QA) list. The overall result of this is that electronic maps created and updated using traditional methods are relatively inflexible and pose a barrier which discourages map vendors from updating their maps on a regular basis.

In some other instances the process of updating is often an impossible task, in that the object or item reflected in the map is not easily identified within the text version of the map. This may be the case for example when a map object has information associated with it that is used by the system in some way, but may not be visible to the end user. In these instances a visual inspection of the map yields little useful debugging information. One example of this type of map object is special street closing information, or street-by-street rush-hour information that defines how the street varies with rush-hour. Unless the map tester uses this actual information for some purpose they may not see it during the QA process. If they don't see it, then they may not check it for accuracy.

Map vendors may often like to approach the debug process from a visual means in that the person debugging the map can see it at the same time. This alleviates the tedium and potential inaccuracy in debugging map information by dealing purely with large text files. In some applications, the digital map vendor or debugger can identify an object by pointing or clicking on the map itself and by entering any modified attributes for the record therein. However, this procedure does not work for those objects described above that are hidden within the map view, for example these properties associated with particular public buildings such as opening times, etc. Modifying entries such as these for items that are otherwise hidden poses particular problems for the map editor. In addition, to date there has been little effort to combine the power of graphical presentation and text entry into one common application, such that an operator can have the best of both worlds. Simply put, an easier and more accurate map viewer, editor, and debugger would mean more accurate maps, and ensure that map vendors and customers can keep pace with the ever-increasing demands for reliable, accurate, and readily updated map information.

SUMMARY

The invention provides a system and method for displaying and editing digital maps, that can be used to view, edit, or debug the map information therein. While traditional methods require the operator to have an in-depth knowledge of the map format, the invention does not. Also, the invention does not hide the graphical format from the debugging process. Instead it harness the power of the graphical representation of the map, and the text representation to provide a more useable mechanism for map viewing and editing.

In accordance with one embodiment, the invention provides a system and method for either alternately or concurrently presenting both graphical (map) and textual information describing the objects or items within that map, and for allowing the user to view or modify records within the map by either selecting items from a graphical map or from a text view. When the user wishes to view or modify a map they can display the graphical map on a computer screen, and display a text view on the same or a different computer screen. As the user selects items within the map, for example a building, street, or park, typically by clicking on the item with a mouse or with some other form of pointing device, the text window changes to reflect the properties of the map item currently selected. The operator can then navigate between map objects better from the graphical view or the text view. Each map object or item is associated with a particular data record that describes the properties or attributes of that item. As used herein these properties may include, for example, a street name, or some relationship of this object to another object. The relationship may be, for example, how one street intersects another street to form a street corner or intersection, or that one street abuts a particular park. As used herein these relationships are referred to as "semantic relationships". The system makes use of these relationships by extracting relationship information from the map itself and displaying it to the user in the text view format so that the user can then select from this text information to easily navigate between map objects, and to make changes to the information defining or associated with those objects. Modifying a text record to update an attribute associated with an object can be used to produce an immediate change in the graphical map itself. At the same time being able to view, display, and edit the record associated with an object provides an easy mechanism by which a map editor can change object attributes. In this way the map can be viewed in a more useable manner, and can be easily and quickly updated to reflect changes in the underlying objects.

Also, the present invention takes a step further to capitalize on the semantic relationships described above. While traditional systems may recognize this semantically related information, for purposes of route-finding, etc., the invention uses this information to provide an easy means to navigate between map items and importantly between information associated with map items. As described above, such information is often hidden from the graphical view. The invention allows an operator to navigate to this item or object by providing a traversal mechanism. In accordance with one embodiment, when the text window is displayed, those attributes that include links to other map items or to other items of information are marked, highlighted, or are visibly identified in some manner. The operator can select a highlighted attribute to traverse to that map item.

Finally, the present invention combines all of these concepts to form a coherent environment by which a digital map developer or user can view, edit, and debug, digital map information. In accordance with one embodiment, the invention comprises a system for map visualization and manipulation that allows for investigation of the relationships between objects irrelevant of map format, comprising a display device, a graphical window on said display device for displaying a graphical illustration of a map or other cartographic information, said graphical illustration representing a plurality of map objects within said map, a text window on said display device for displaying a text record of attributes associated with a first map object, including records semantically linking the first map object with a second map object, a cursor or alternative selection mechanism for selecting a map object, or any of the records within the text record, and traversing the semantic link between the first and second map object to retrieve information about the second object or to redraw the map to focus on the second object.

In another embodiment this invention comprises a method for allowing an operator to visualize or manipulate graphical maps, comprising the steps of displaying a graphical illustration of a map or other cartographic information, said graphical illustration representing a plurality of map objects within said map, displaying a text record of attributes associated with a first map object, including records semantically linking the first map object with a second map object, allowing the operator to select a map object, or any of the records within the text record, traversing the semantic link between the first and second map object and retrieving information about the second object or to redraw the map to focus on the second object.

BRIEF DESCRIPTION OF THE DRAWINGS

FIGS. 13–22 shows screenshots of one embodiment of the invention can be integrated or used with a viewer application to allow viewing and editing of digital maps.

DETAILED DESCRIPTION

Figure 1:
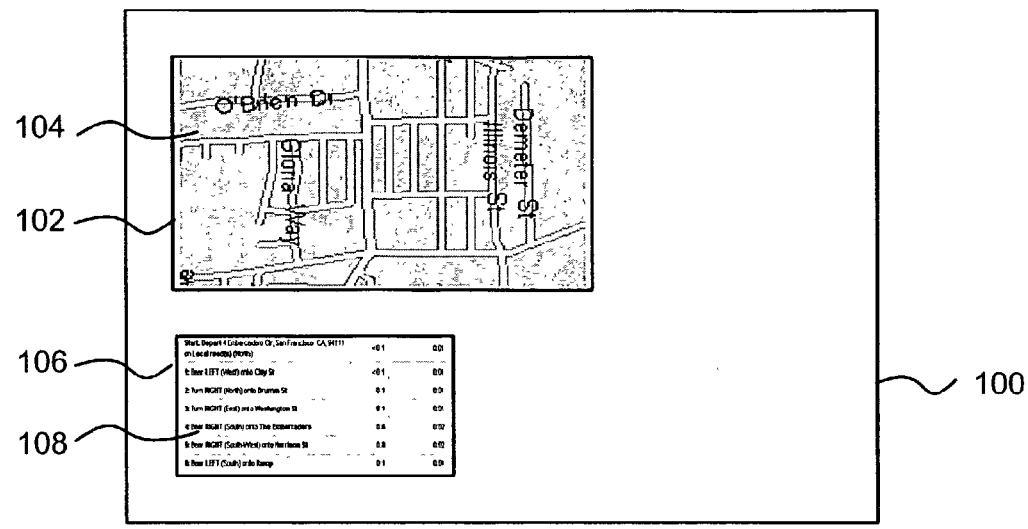
FIG. 1 shows a typical example of how a digital map is used by a software application to provide map and direction information to an operator.

Generally described, the provides a system and method for displaying and editing digital maps, that can be used to view or debug map information. While traditional methods require the operator to have an in-depth knowledge of the map format, the invention does not. Also, the invention does not hide the graphical format from the debugging process. Instead it harness the power of the graphical representation of the map, and the text representation of objects within the map to provide a more useable mechanism for map viewing and editing. When the user wishes to view or modify a map they can display the graphical map on a computer screen, and display a text view on the same or a different computer screen. As the user selects items within the map, for example a building, street, or a park, typically by clicking on the item with a mouse or with some other form of pointing device, the text window changes to reflect the map object currently selected. Each map object or item is associated with a particular data record that describes the properties or attributes of that object. As used herein these properties may include, for example, a street name, street property such as length, or some semantic relationship of this map object or item to another map object or item. The relationship may be, for example, how one street intersects another street to form a street corner or intersection, or that one street abuts a particular park. The system makes use of these relationships by extracting relationship information from the map itself and displaying it to the user in a textual format so that the user can easily navigate between map objects, and can make changes to the information defining or associated with those objects. Modifying a data record to update an attribute associated with an object can be used to produce an immediate change in the graphical map itself. At the same time being able to view, display, and edit the record associated with an object provides an easy mechanism by which a map editor can change object attributes. In this way the map can be viewed in a more useable manner, and can be easily and quickly updated to reflect changes in the underlying objects.

Typical Usage

Generally described, the invention can be used to provide a means such as a viewer or editor application by which an operator can view, verify, and edit electronic or digital map data, and particularly view map object or object-related information within the map. A computer is used to allow the operator perform this task, by providing a mechanism by which maps can be retrieved into the memory of the computer and on which the map viewer or map editor software application runs. A primary purpose of the viewer/editor provided by the invention is to allow operators to maintain the accuracy of map data, for example by updating the maps to reflect changes to the underlining geography.

However, the invention can also be used in everyday usage, for example as integrated into portable or handheld electronic devices, or in navigation devices, where the operator wishes to access map data on a detailed level which is not possible using existing means. The invention works by identifying map items within an electronic or digital map when the map is retrieved into the computer. As used herein the term "map item" or "item" is used to refer to any item displayed on a map, or any item included within a map but not currently displayed. For example, some items may only be items of information, in which case they are more properly thought of as map item information. Once these map items have been identified, they can be stored in the memory of a computer or other electronic device in the form of software objects. Each map item, now represented as an object, may include a number of associated parameters, typically arranged as field/value pairs. In addition, each map item may include links to one or more other map items. In the object oriented programming (OOP) world, this linking is typically done by the use of pointers. Pointers are used to link related objects together. Because the map items are linked in such a manner, once a first map item is identified or selected, for example by the actions of an operator or by some other means, then the pointers can be followed to other map items linked to that first map item, and soon. In this way, the operator can traverse a link of map items. In addition, the invention provides a means by which the attributes representing the map item are displayed in a textual manner. For example, the invention in some embodiments may include a text window wherein the fields of the text window correspond to the object attributes. Grouped together the fields comprise a "record". Each map item or item of information can be represented by an object in memory; while each object in memory includes a number of attributes. The attributes can be displayed in a text window. The text window defines textually the record associated with the map item. Displaying the fields in a textual manner allows the operator to quickly identify a particular map item. In addition, fields that contain links to other map items can be represented in a highly visible or identifiable manner, for example by prefacing the field with a special character or icon, such as an asterisk ("*"), by using a different color, or by providing some other graphical notation. Clicking on one of these fields, and following the links therein, allows the operator to retrieve information from the object linked by the underlying pointer, and hence about the map item associated with that linked object. In this way, the operator can quickly navigate through a set of related map items from the text window. Being able to navigate through a set of linked objects, corresponding to map items within the digital map, either from a graphical window or from a text window allows the operator to quickly and easily navigate to a particular map item or item of information.

Figure 2:
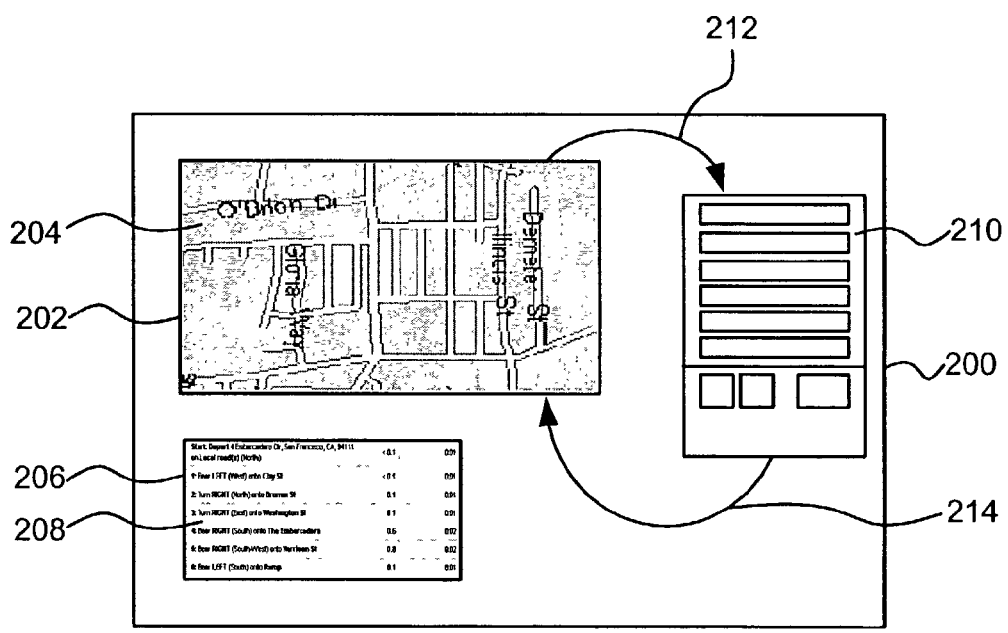
FIG. 2 illustrates a screen display in accordance with one embodiment of the invention, as it may be used by a user or operator to view and edit a digital map.

FIG. 2 illustrates a screen display in accordance with one embodiment of the invention, as it may be used by a user or operator to view and edit a digital map. As shown in FIG. 2, in a typical implementation, the graphical or digital map 204 is displayed in a graphical view window 202 on the operator's computer screen or display 200, together with the map items that comprise the graphical view. The operator may at any time open a text window for displaying a text view of map items. In other embodiments, the text window 210 opens automatically when a map item is selected. When the operator selects a map item from the graphical view window, the text view window is updated 212 to display the record associated with that map item. As the operator selects different map items from the graphical view, the text view is automatically updated, so that at any point in time the operator can see visibly both from the graphical view window and from the text view window which object they are working with. In addition, modifications to the record in the text view window can be automatically updated 214 in the graphical view. For example, if the operator traverses through the text view window to other map items, the graphical view window changes to zoom in or to focus on the currently selected map item. The invention thus allows the operator to traverse or manipulate digital maps including chained map items, in a parallel fashion, wherein changes to the graphical window and/or selections of map items within the graphical window are updated in the text window. At the same time, changes to the text window are also automatically reflected in the graphical window. The ability to perform this parallel update allows both the graphical and the textual information describing the map to be displayed in front of the operator at the same point in time, and allows for quick and easy access to map item data, either for purposes of verification or for editing, updating, and debugging.

In addition to providing a mechanism for quickly selecting and updating visible map items, the invention can be used to view and/or update other information on the map that is not typically or easily accessible. Because the system allows for accessing map items that are linked to other map items, the operator can navigate through the links to select map items that are otherwise not visible in the graphical view. For example, some map items such as roads may have specific closing times or other attributes that, while very useful, would not normally appear as a displayed item on a map. These hidden features and items are used in some applications, for example in determining navigation paths, but because they are hidden they are difficult to locate, let alone debug. Using the invention, the operator can quickly navigate to such attributes and view or modify them. When operating in this manner, the graphical view may not visibly change to the operator's view. In other embodiments a visual notification that the operator is modifying an otherwise unseen attribute may be provided. In this way the invention can be used to provide a mechanism for viewing and understanding the connectivity between information associated with map items, rather than with the map items themselves. Traditional methods do not allow an operator to readily see which entities are related to other entities through a common information.

Figure 3:
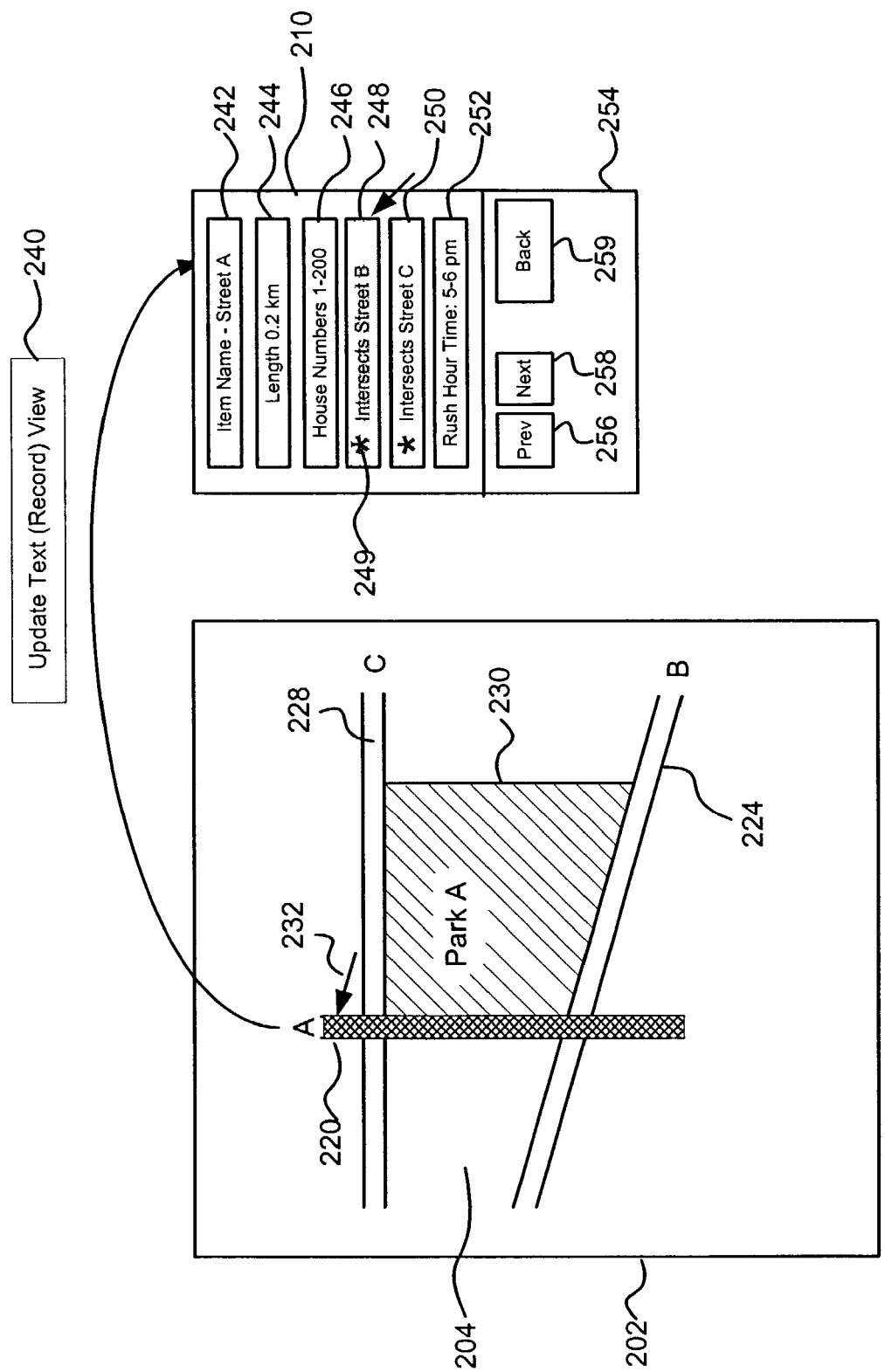
FIGS. 3 and 4 illustrate how, in accordance with one embodiment of the invention, the operator can select from either the graphical view and from a variety of map items displayed therein, and display a text view which illustrates linkages between the map items and other attributes associated with each item.
Figure 4:
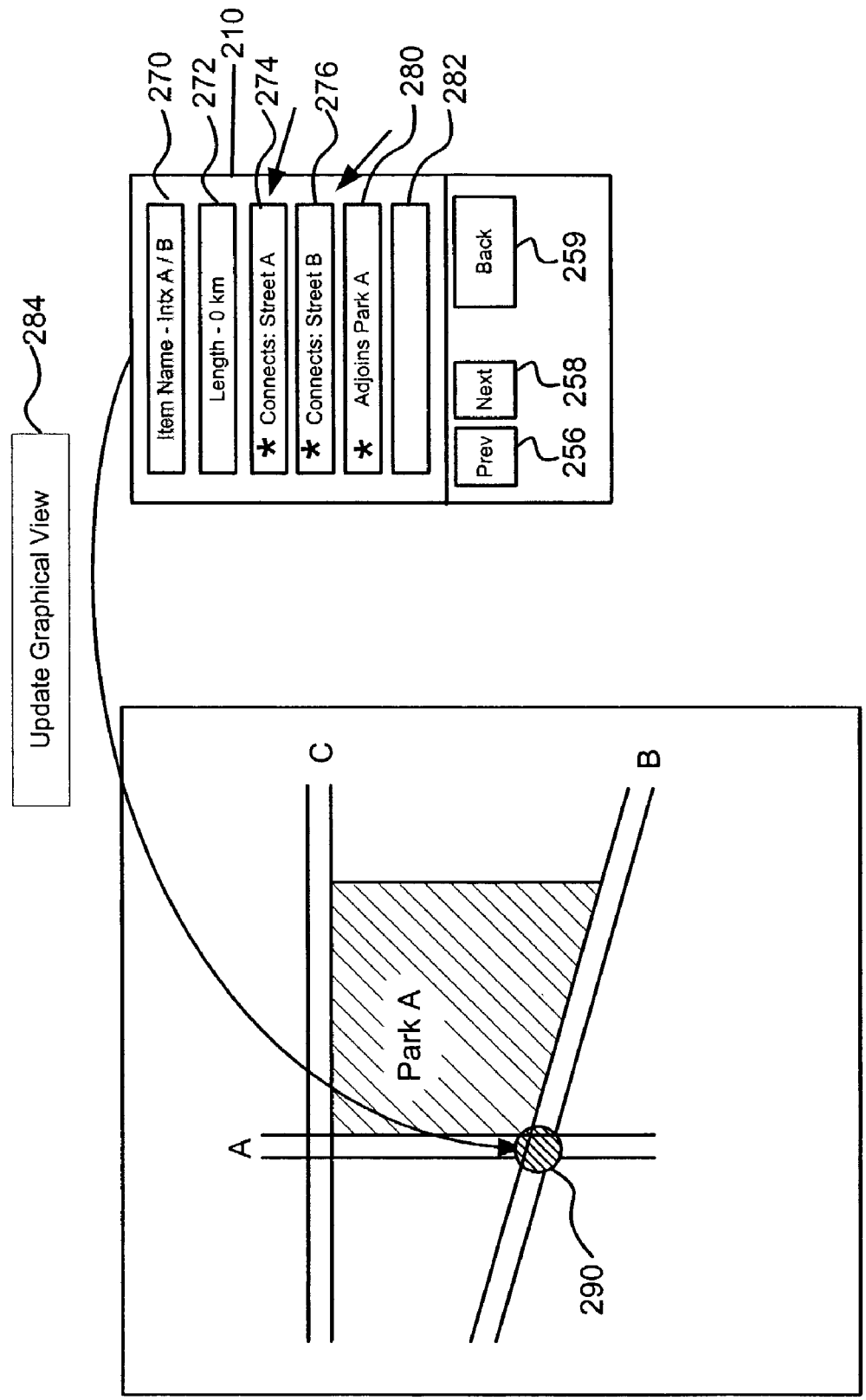

FIG. 3 and FIG. 4 illustrate how, in accordance with one embodiment of the invention, the operator can select from either the graphical view and from a variety of map items displayed therein, and display a text view which illustrates linkages between the map items and other attributes associated with each item. Conversely, the operator can select a record item from the text view and allow the graphical view to be automatically updated to focus on that view. FIG. 3 illustrates a typical digital or exemplary graphical view 202, in which a map 204 of an area is shown. A Park A 230 is bordered by a number of streets, in this example indicated as street A 220, street B 224, and street C 228. The map shown in FIG. 3 is very simple, and not entirely typical of the type of complicated maps that may typically be used with the invention. However, it is shown here for ease of illustration.

A text view window 210 is displayed, typically in the operators screen although in some instances could be displayed on a remote screen. The text view displays a record associated with a particular map item. For each map item there is at least one corresponding record. When both the graphical view and the text view are displayed, the operator can, as an initial step, select any item that is visible within the graphical view, in this instance street A, and allow the system to display the attributes and fields (i.e., the record) associated with that map item in the text view window. Selecting a new item automatically causes the text view to change 240 to that new item. The text view window displays fields (242–252) that are associated with the map item. For example, as shown in FIG. 3, street A has a record which includes name field 242 and rush-hour field 252. Additionally, any links between this map item and any other map items are shown and indicated by a visible marker 249. These semantic links, as used in the invention, allow map items to be linked according to some underlining logical reason or format. Fields 248 and 250 of FIG. 3 are identified as semantic links indicating that they link to other map items, in this case street B and street C respectively. Typically the logic or format of linking is defined by the person responsible for the map format. For example, the format and thus the linking may depend on whether the map format is in a GDF, or some proprietary format. Because the original map format developer defines what they perceive to be important links or associations within that map format, the invention makes use of the underlying map format to determine which links it should display within the text view, rather than imposing its own sense of hierarchy or format.

This ensures that the invention can be used with all map formats both current, and yet to be developed. For example, in the example shown in FIG. 3, in the graphical view the selected street A intersects both streets B and C, and Park A, which in turn means the record attributes associated with this street also include links to streets A and B. Other links may include that the intersection is associated with park A, for example, forming a corner point of the park (although these links are not shown here). This linking is created because the map format includes information about the streets and its intersection with other streets, and not because the user has guessed in any manner. The invention does not depend solely on a particularly underlying format to determine its relationships, and the links it will show in the text view. Instead, any number of map formats can be used, and when investigated using the invention, the links within the format are understood and represented accordingly.

As shown in FIG. 3, the map item selected by the operator has a number of attributes or fields associated with it which are shown in the text view window. Of greater importance in the context of this invention are those fields which include links to other map items. Such fields are indicated by, for example, the presence of a "*" 249, or by a change in color or some other visible indication. The indication tells the operator that clicking this field will jump to the other item referenced therein. This allows the operator to select other map items either by graphically pointing and selecting them from the graphical view as described above as being an initial step, or by following their links within the text view window. Selecting a link causes both the text view, and optionally the graphical view, to be updated in parallel.

FIG. 4 illustrates an example of how an operator can use the text view window to traverse a semantic link between a first map item and a second map item. Referring back to FIG. 3, selecting one of the active links between the first map item and a second map item causes the second map item to be displayed within the text view. So, for example, selecting the intersection with street B field 246 causes the system to follow the semantic link to the intersection B connected to street A, i.e., the intersection between streets A and B, as now shown in FIG. 4. Typically the graphical view may be redrawn to highlight or otherwise focus in on the now newly selected map item. In the example shown in FIG. 4, the graphical view merely highlights the newly selected item, in this instance intersection A/B 290. The record is appropriately updated in the text view window 210 to reflect the now selected item intersection A/B, together with a new name 270 and new attributes 272–282, together with appropriately identified links to other items. Being able to select map items in this way, either from the graphical view, or from the text view, by means of semantic links, allows the operator flexibility in how and by what mechanism they choose to select map items. Particularly, some map items that may not be selectable from the graphical view, for example information associated with a map item that is not typically shown on a map, can now be selected from the text view by selecting the appropriate linkage to that information. In this way, the invention allows map item information, as distinct from purely defined map items, to be selected from the text view using this easy mechanism.

One example of this map item information may be map item information that relates a street to special street closing times. For example, during rush hour some streets may be designated as one way streets. This information is typically difficult to show on a map, and as such is similarly difficult to update or debug. Using the invention, the special street closing information can be associated with the visible street map item. When an operator selects the street map item the appropriate map item information record is displayed in the text view, as will the information that pertains to street closing. Often this information will be represented not as discrete fields but as links to a street closing information record. Selecting that item from the text view allows the operator to traverse to the relevant information, and to view, update, or debug it.

Semantic Network Understanding

Figure 5A:
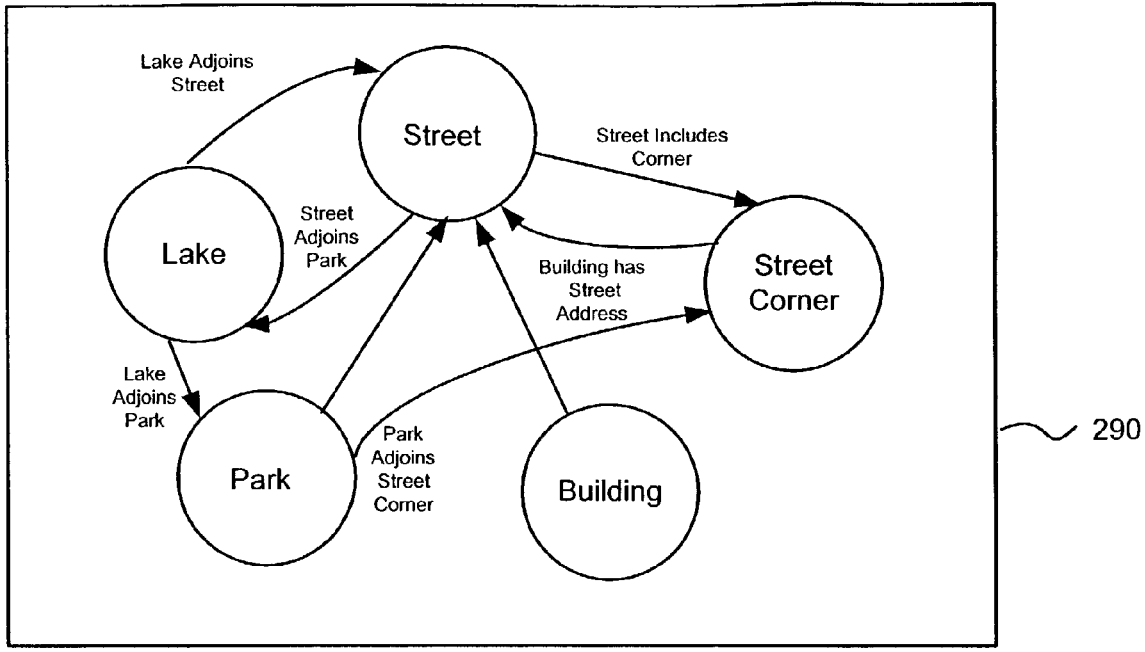
FIGS. 5A and 5B illustrate how a semantic network is used to provide a basis for map understanding in accordance with an embodiment of the invention
Figure 5B:
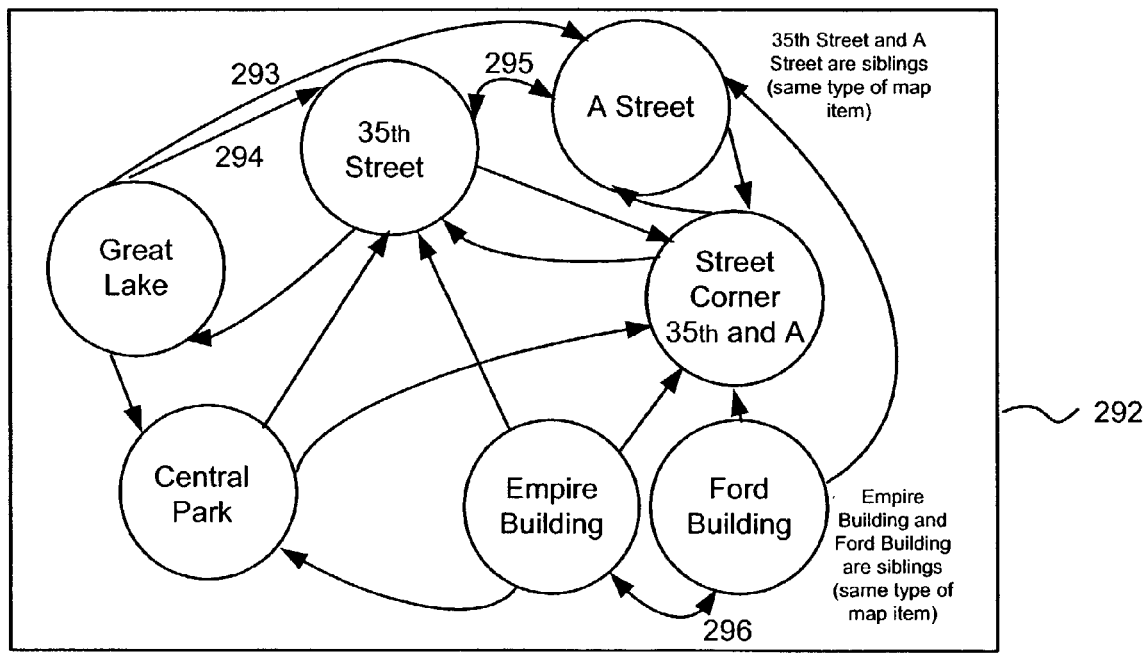

FIG. 5A and FIG. 5B illustrate how a semantic network is used to provide a basis for map understanding in accordance with an embodiment of the invention. As shown in FIG. 5A, the semantic network 290 provides an understanding of the variety of underlying map item types. For example, the semantic network allows the system to understand that a lake item type may adjoin a street item type, or a park item type; or that a street item type may include a street corner item type, and that a building item type typically has a street address and may also be located on a corner.

The system makes use of this understanding to create relationships between actual map items, as shown by way of example in FIG. 5B. When an actual set of data is retrieved into memory, the system uses its semantic understanding of the relationships between map item types to create relationships or links between the various map data elements. Relationships can be created linking map items of different type (for example linking a street item to a lake item). In the example shown in FIG. 5B, $35^{th}$ Street and A Street are linked to Great Lake by relationships 293 and 294 respectively. These inter-type links, that link certain map items referred to herein as "cousins", can be later used to allow an operator to traverse between map items of different type, either from the text view window or from the graphical view window.

Relationships can also be created linking map items of the same type (for example linking one street item to another street item, or one building item to another building item). In the example shown in FIG. 5B, $35^{th}$ Street and A Street (both of which are streets) are linked to one another by a relationship 295, while the Empire Building and the Ford Building (both of which are buildings) are linked to one another by a relationship 296. These intra-type links, that link certain map items referred to herein as "siblings", can be later used to allow an operator to traverse between map items of the same type, again either from the text view window or from the graphical view window.

Figure 6:
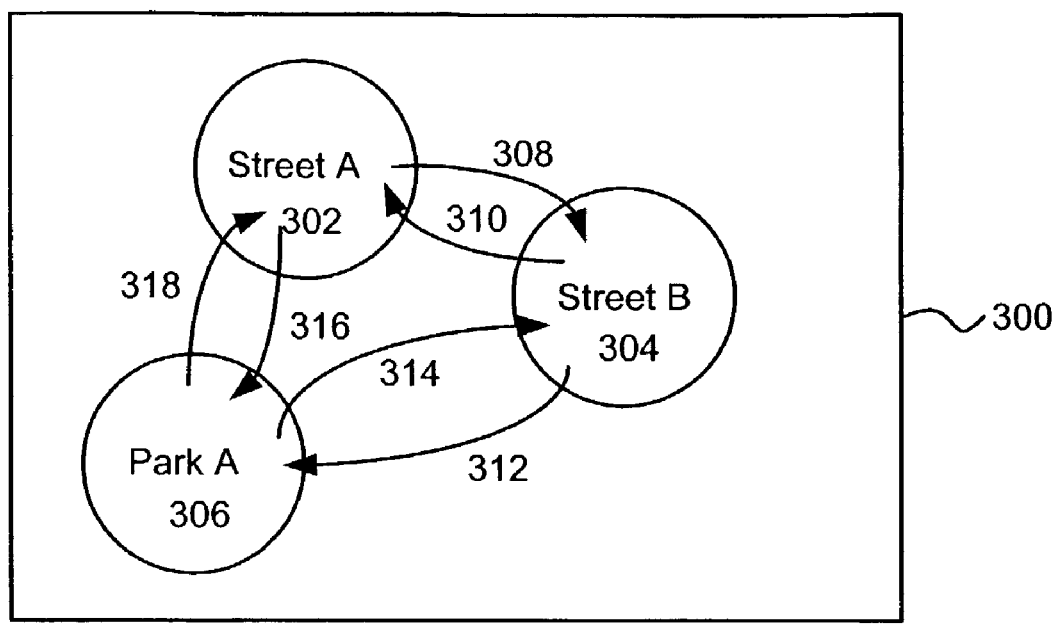
FIGS. 6 and 7 illustrate the distribution and linking of map items as represented within the memory of a computer system in accordance with an embodiment of the invention.
Figure 7:
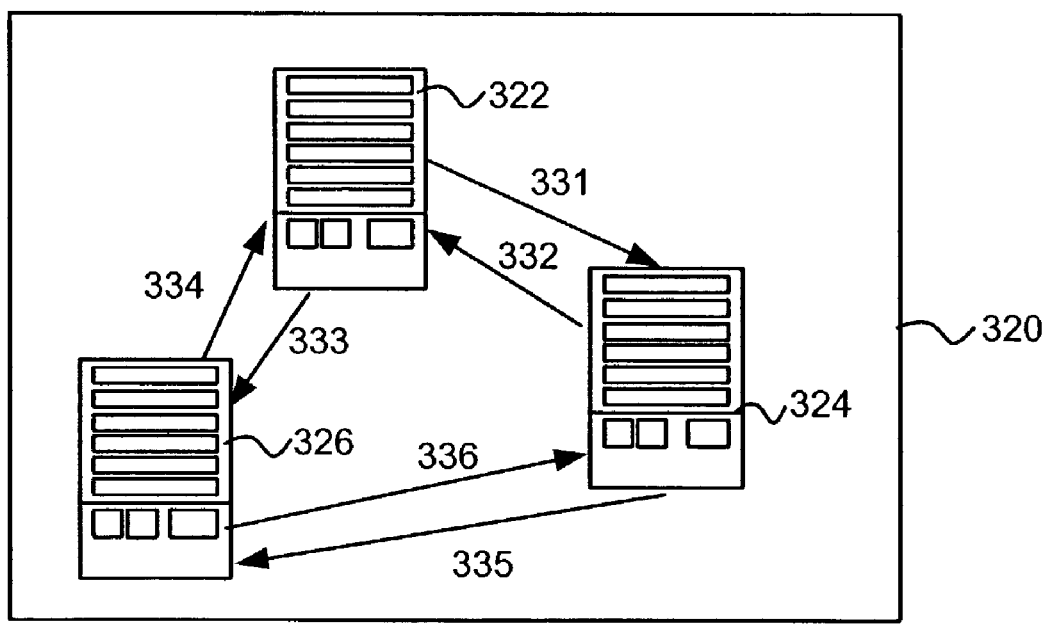

FIGS. 6 and 7 illustrate the distribution and linking of map items as represented within the memory of a computer system in accordance with an embodiment of the invention. As shown in FIG. 6, each physical item represented in the map is typically linked according to the map format. For example, the map format defines whether a street A 302 intersects a street B 304, and soon. Inherent in the map format are links 308, 310 between these map items. The invention makes use of this information and an understanding of the particular format used to create objects in memory that represent the map items, also appropriately linked.

As shown in FIG. 7, each map item is represented in memory as an object. Typically the object will have associated fields that define the object itself, but importantly in the context of the invention, each object can also includes links or pointers to other objects. This feature of object technology is used to provide the invention with a means for creating the semantic links between map items and map item information that are then used to maintain the parallel update feature. As shown in FIG. 7 for example, a street A 322, is linked to a street B 324, typically by means of an intersection. Street A and street B are similarly linked to park A 326. There may be streets that abut or coincide with park A. Each object (322, 324, 326) shown on the map includes an associated software object, which is represented graphically in FIG. 7 although it will be evident to one skilled in the art that the storage and memory are not necessarily the same as that illustrated. Because each object is also typically linked by means of a two way pointer to other related objects, each of the objects can be considered siblings for the purpose of map hierarchy and navigation. For example, an operator viewing the information associated with street A 322 can follow the pointer 311 to the street B object 326, and vice-versa (i.e. to view the information in B the pointer 332 is followed to the street A object). An operator interested in information related to street B can follow the pointer to find information associated with park A. Although it will be evident that the item shown in FIG. 7 all correspond to physical map items i.e., items that are viewable on the graphical view or digital map, addicted map item information can be similarly linked to an object representing a physical map item, so that the operator can traverse links to map item information that would otherwise not be viewable on the typical map.

Previous, Next, and Back Features

As shown in FIG. 3 and FIG. 4, and described briefly above, some embodiments of the invention may include a "Previous" ("Prev"), "Next", and "Back" feature. For example, in FIGS. 3 and 4 these features are represented respectively by buttons or icons 256, 258, and 259 in a portion 254 of the text window 210. These buttons or icons may be selected by the operator to perform a traversal operation between map items from the text view window. Depending on the particular implementation, some or all of the buttons may be supplied, for example, in some implementations only the Prev and Next features may be included, and the Back feature omitted. The buttons are typically selected by the operator using a mouse or some other pointer device. These Prev, Next, and Back features provide a powerful means by which the operator can quickly (using just single mouse clicks) traverse the semantic network that underpins the map items, either by traversing between map items of the same type, or by traversing between map items of a different type.

The Prev button is used to traverse between map items of the same type. When the operator clicks on the Prev button, the semantic network and the underlying map data is examined to determine the previous map item from the current map item. That (previous) map item is then selected for view in the text window, and depending on the implementation, the graphical window redrawn to highlight the newly selected map item. Although this may appear to the operator as a "back" function commonly found in a browser, the Prev operation performs more than a mere reversal of past steps or selections. When the Prev operation is selected, the system checks the semantic network, and the map being examined, to determine which is the previous map item of the same type. In many instances this may be the map item of the same type having, for example the next lower ID than the currently selected item. In other instances, the previous map item may alphabetically precede the current one. Other sorting means will be evident to those skilled in the art. The invention is designed to work with any underlying map item sorting used in the underlying map format. For example, in some embodiments that use a GDF map format, the Prev button can be used to display the record immediately above the current record in the GDF file.

The Next button is also used to traverse between map items of the same type. Similarly to the Prev button described above, when the operator clicks on the Next button, the semantic network and the underlying map data is examined to determine the next map item from the current map item. That (next) map item is then selected for view in the text window, and depending on the implementation, the graphical window redrawn to highlight the newly selected map item. When the Next operation is selected, the system checks the semantic network, and the map being examined, to determine which is the next map item of the same type. This may be the map item of the same type having, for example the next higher ID than the currently selected item, or the map item alphabetically succeeding the current one. For example, in some embodiments that use a GDF map format, the Next button can be used to display the record immediately below the current record in the GDF file.

The Back button is used primarily to traverse between map items of a different type, which provides a powerful mechanism for the operator to quickly traverse the semantic network to view, retrieve, or edit map items that differ in type from the currently selected map item, but are related in some way through the semantic network. The "Back" button effectively moves the point of investigation to the "cousin" record that precedes the current record. When the operator clicks on the Back button, the semantic network is examined to determine the cousin map item previous to the current map item, and which is related to the current item by a semantic relationship or a link. The cousin map item is then selected for view in the text window, and depending on the implementation, the graphical window redrawn to highlight the newly selected map item. This feature allows the operator to step backward between map items of different types, traversing the links between each item as they go. (Traversing forward between map items of different type is performed by the operator explicitly selecting linked fields from the text view, or linked items from the graphical view, as previously described above). In this sense the Back feature is not merely a random back operation that depends on a sorting criterion (like the Next-Previous button pair), but instead allows the operator to step back based on an internal stack of cousins that is created as the operator follows the linked or "*" fields of a record. So, for example, if the operator examines a junction between two streets (i.e. a street corner), and from that record uses an "*" link to traverse to one of the streets which participate in this street corner, and from that street to a park adjoining the street, then the park will currently be the selected map item. A click of the Back button allows the operator to return to the street. Another click of the Back button allows the operator to return to the street corner.

Field Based Navigation

Figure 8:
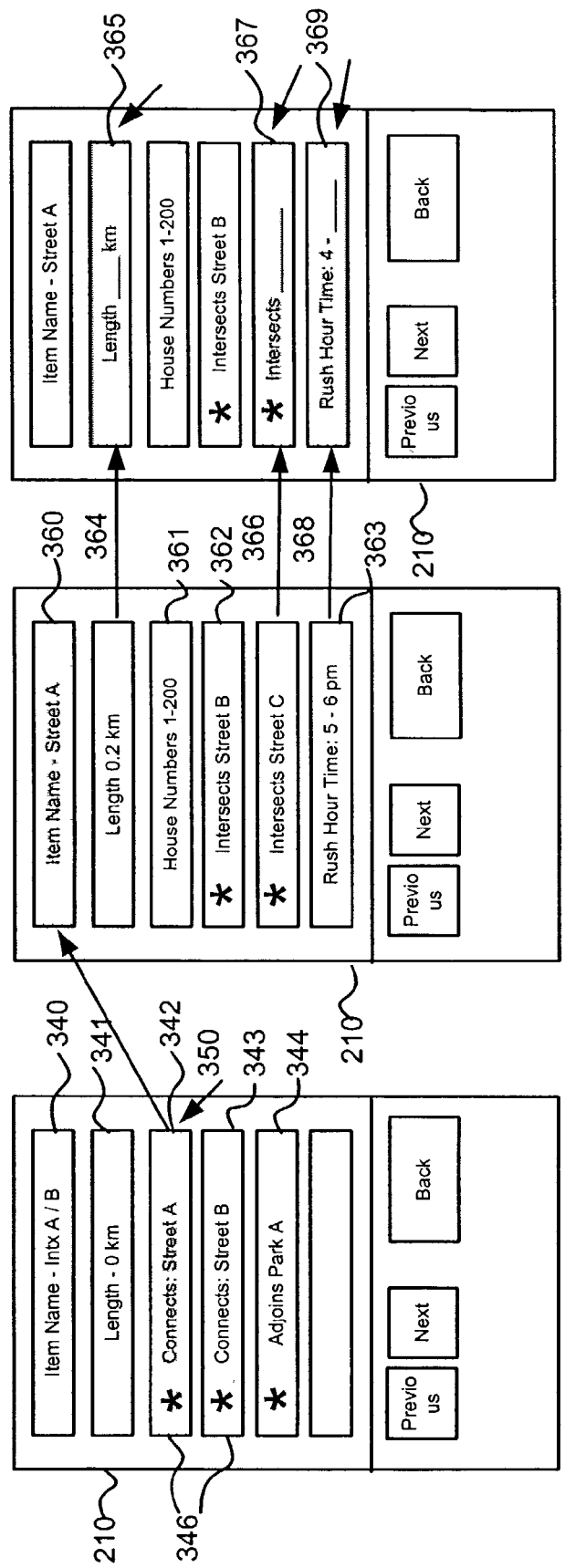
FIG. 8 illustrates in further detail one example of how the text view window changes as particular map items are selected or displayed, so that the fields associated with their records are accessible or viewable to the operator.

FIG. 8 illustrates in further detail one example of how the text view window changes as particular map items are selected or displayed, so that the fields associated with their records are accessible or viewable to the operator. The text view screen changes when an operator selects one item from the field of available items within the map item record that then links semantically to another map item or piece of information. As shown in FIG. 8A, a first view of the text window 210 shows attributes associated with a particular map item, for example an intersection between streets A and B having a name intersection A/B 340. Some fields within this map item record describe the actual map item, for example the intersection distance 341, if any, or its connection to other entities, such as Park A 344, or its starting point and stopping point. The invention also allows other fields to be included in the record that allow the operator to traverse between fields to find related information. For example, as shown in FIG. 8, some fields 342, 343 within the record indicate the connecting streets or streets that have some relationship to this intersection. As shown in FIG. 8, intersection A/B connects to street A 342 and street B 343. These semantically related fields are identified to the operator typically by some means of visual indicator such as an asterisk 346, a change in color, or some combination of display icons. The visual indication serves to identify to the operator this particular field as having a link to another item of information. Selecting 350 one of the related fields such as the connection field to street A 342, as shown in FIG. 8B, retrieves the text record information associated with that new item and changes the text view window accordingly. This new item 360 may for example be an intersecting street, as shown in FIG. 8B, in which said case it will typically have links 361 back to the original street or intersection. The new item may instead be information that is not typically shown on a map. Because each first item includes a link to the second item and the second item includes a corresponding reverse link to the first item, the items may be considered siblings for the purpose of map item hierarchy. In this sense, the items are related by a relationship information that the operator can then use to traverse between map items. Other fields such as the rush-hour time field 363 shown in FIG. 8B do not link to other objects but contain all information within the record itself. Regardless of the presence of a link or not, the operator may, depending on the implementation be able to edit the entry. This is the primary difference between a viewer application and an editing application. As shown in FIG. 8C, the operator can in some embodiments alter 364, 366, 368 any of the fields 365, 367, 369 respectively including where found the link to other siblings (such as field 367 in this case).

While not shown in FIG. 8, as each item is linked using the semantic links textually displayed within the fields of the text view, the graphical view can be updated to retrieve, point to, or focus on the newly selected item. In this way the invention allows for rapid traversal of related map items in parallel, either from the text view or from the graphical view. When used in the text view environment this is particularly useful for quickly locating and debugging map related information.

Figure 9:
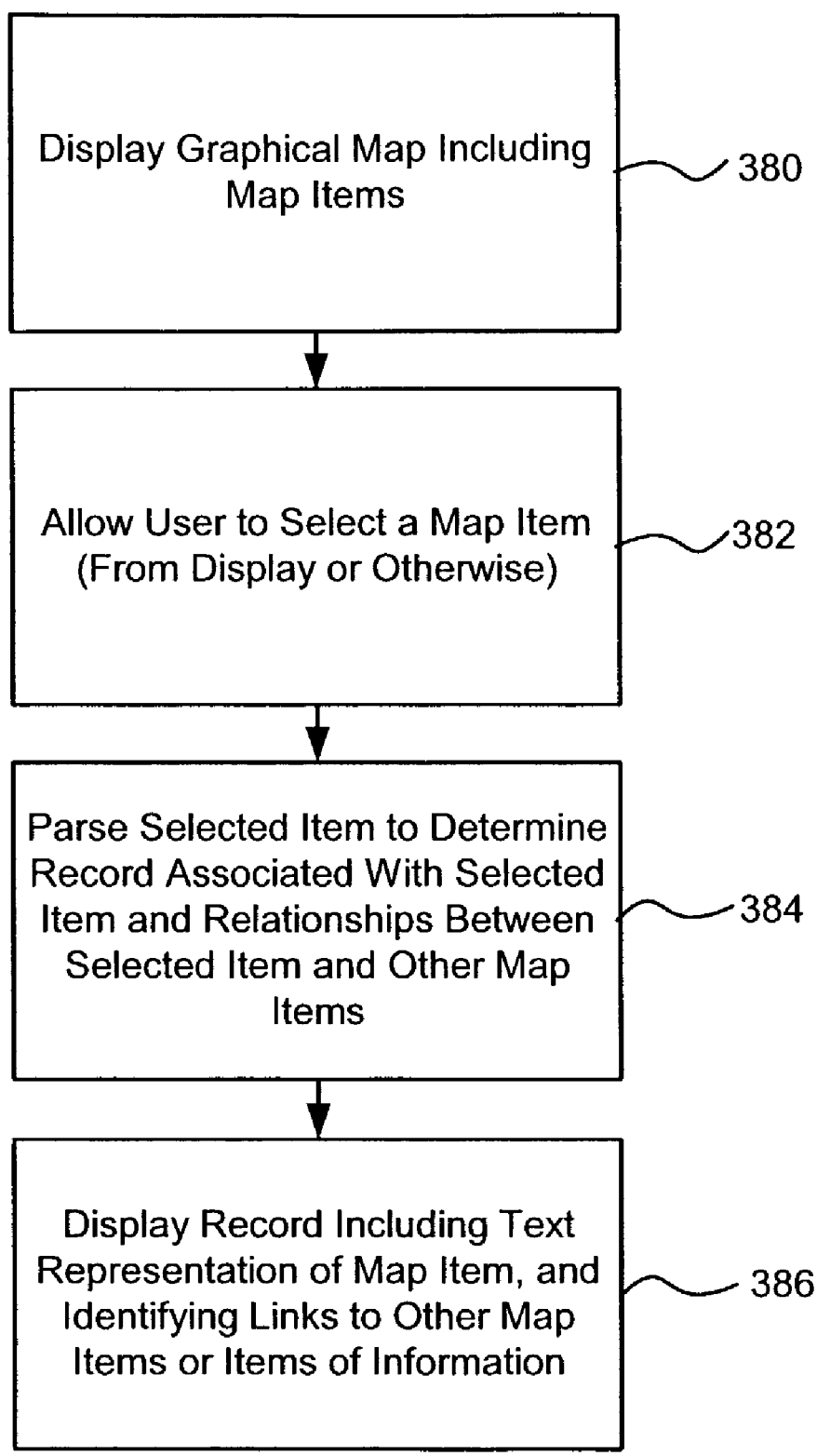
FIG. 9 illustrates the typical flow of a process in accordance with the invention that allows the operator to select map items, or map item information, for updating, debugging or simply viewing, using either a graphical view window or text view window and wherein the graphical view window and the text view window can be updated in parallel so that the display in one window reflects changes made by the operator within the other window.

FIG. 9 illustrates the typical flow of a process in accordance with the invention that allows the operator to select map items, or map item information, for updating, debugging or simply viewing, using either a graphical view window or text view window and wherein the graphical view window and the text view window can be updated in parallel so that the display in one window reflects changes made by the operator within the other window. As shown in FIG. 9, in step 380 the process typically begins by the computer system or on other processor executing the invention, displaying or providing a means for allowing an operator to view or to select from a computer generated or digital map one or more map objects. In a typical implementation, the operator uses a computer system which includes a computer display, and some form of graphical interface executing thereon, for example a Unix Windows environment, a Mac OS, or a Microsoft Windows environment or some other graphical application environment. It will be evident to one skilled in the art that the invention can be equally used with other forms of graphical user interface (GUI). Other implementations of the invention can be designed for use with specific graphical devices and systems for example with in-car navigation systems, or with specialized navigation systems for use in marine, aviation, navigation, and military applications.

Once the graphical interface is running, the operator typically instructs the computer to display a digital map or some other variant of the digital data. Usually this is done as part of a map-viewing application (i.e., a "map viewer"). The invention can be used either as part of its own map viewing software, or can be incorporated as a component into other map viewing and cartographic applications. With the map now displayed on the screen in a graphical window the operator can also open a text view window which will be used in parallel with the graphical window to represent map item information. In other embodiments, the text view window opens automatically as needed. In step 382, the system allows the user or operator to select a map object from the graphical view presented on the display. Typically this is done by means of a cursor or other pointer device, wherein the operator simply points to and clicks on a map item in order to select it. In other implementations, the operator may be allowed to select a range of map items, for example by drawing a square around a number of map items or sequentially clicking on a plurality of items. When a number of map items are selected, the "previous", "next", and "back" buttons of FIG. 4 can be used to cycle between the items. Other implementations allows the operator to click in the vicinity of one map item, and allow the system to understand that this may also include those map items around it.

In step 384, once either one or more map items are selected, the process interprets the underlining software object associated with each map item. As described above, each map item is typically associated with a software object. Each software object in turn has records and pointers associated with it that provide item information, and also provide a linkage between a first item and a second item. The selected object is parsed, i.e., the object that corresponds to the selected map item, to determine the record and fields associated with the selected map item, and the relationships between this item and other items. In step 386, once the item information has been parsed, the text view window is updated to display the record associated with the selected map item, relationships between this map items and other map items, and other items of information. This information is then displayed to the operator, and the operator is allowed to select further particular items of information that link to other items.

Graphical (Map) Based Navigation

As mentioned above, in some embodiments the operator can navigate between map objects either from the graphical view or from the text view. Particularly, the invention provides a means by which the operator can navigate map items from the graphics screen, while the text view is automatically updated in parallel.

Each map object or item is associated with a particular data record that describes the properties or attributes of that item. When both the graphical view and the text view are displayed (although in some instances the text view window can be hidden from view until needed), the operator can select any item that is visible within the graphical view. Selecting a new item automatically causes the text view to change to that new item, and to displays any fields that are associated with the map item. The graphical view can also be updated to highlight, focus, or otherwise identify the newly selected item currently under investigation.

The process is typical to that described above for field based navigation. Once either one or more map items are selected, the process interprets the underlining software object associated with each map item. As described above, each map item is typically associated with a software object. Each software object in turn has records and pointers associated with it that provide item information, and also provide a linkage between a first item and a second item. The newly selected object is parsed, i.e., the object that corresponds to the selected map item, to determine the record and fields associated with the selected map item, and the relationships between this item and other items. The graphical view is updated to highlight the newly selected item, and at the same time (i.e. in parallel) the text view window is displayed (or if already displayed then automatically updated)to display the record associated with the selected map item. The text view window also shows any relationships between this map items and other map items, and other items of information. The operator is then allowed to select further particular items of information that link to other items. Alternatively they can return to the graphical view and select a new map item using that method.

Search Based Navigation

In some embodiments, an additional means of navigation can be provided using a search mechanism. This means of navigation results in a parallel update to both the graphical and the text windows in response to a search criteria. A search dialog can be used to find, for example, a geographical location, a record number (such as street number#234 in the index), or a street name. Search constraints may also be used, for example by specifying any street with the letter "x" in the name, and that borders on a park. When such an item (or items) are found, the graphical window can be updated to show them, while the test window is similarly updated. If more than one item is found to match the search criteria, a mechanism can be provided to sequentially click through the list of found items.

System Implementation

Figure 10:
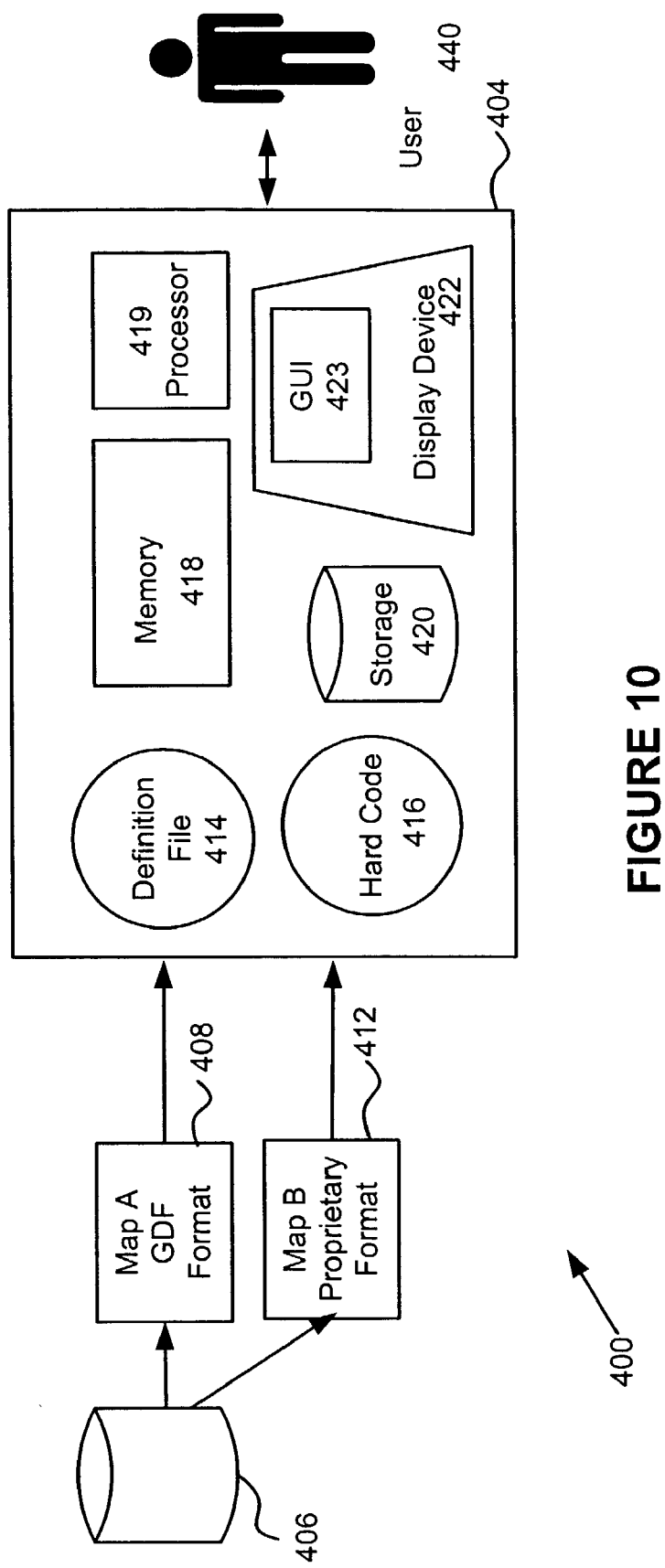
FIG. 10 illustrates a schematic of a possible system that can be used with an embodiment of the invention, in which the system allows for a variety of map formats to be retrieved, manipulated, viewed, and edited by an operator or user according to the above description.

FIG. 10 illustrates a schematic of one type of system that can be used with an embodiment of the invention, in which the system allows for a variety of map formats to be retrieved, manipulated, viewed, and edited by an operator or user according to the above description. As shown in FIG. 10, the system 404 typically includes a memory 418, a processor 419, and a storage or repository 420 of some sort. The system further includes a display device 422 or monitor, including a graphical user interface or GUI 423 operating thereon by which the system can display digital maps and other information.

The system shown can be used to display to an operator 440 a graphical and text view of a map data such that the graphical and text views can be updated in parallel and also allow the operator to semantically traverse between map items and map item information. When a digital map is retrieved from external storage 406 (which in some instances may be the same storage as storage 420), the system may interpret it in a number of ways. When the map format is known, for example a GDF format 408 or some other ISO standard format, then the system may use a format definition file 414 incorporated within the logic of the system, that is then used to interpret the map format. For example, the definition file can be used by the system to interpret the hierarchy of objects within the map, and relationships between those objects. In other instances, for example when the map format is a proprietary format 412, hard coding 416 can be used within the logic of the system to interpret the underlining map format and convert it to a semantic linkage of objects in memory, which are then interpreted by the system and used to provide the parallel traversal mechanism. As mentioned above, an important feature of the system is its ability to work with an endless variety of present and future map formats. Because the system may manipulate different definition files, it can be customized to work with many formats simultaneously.

Figure 11:
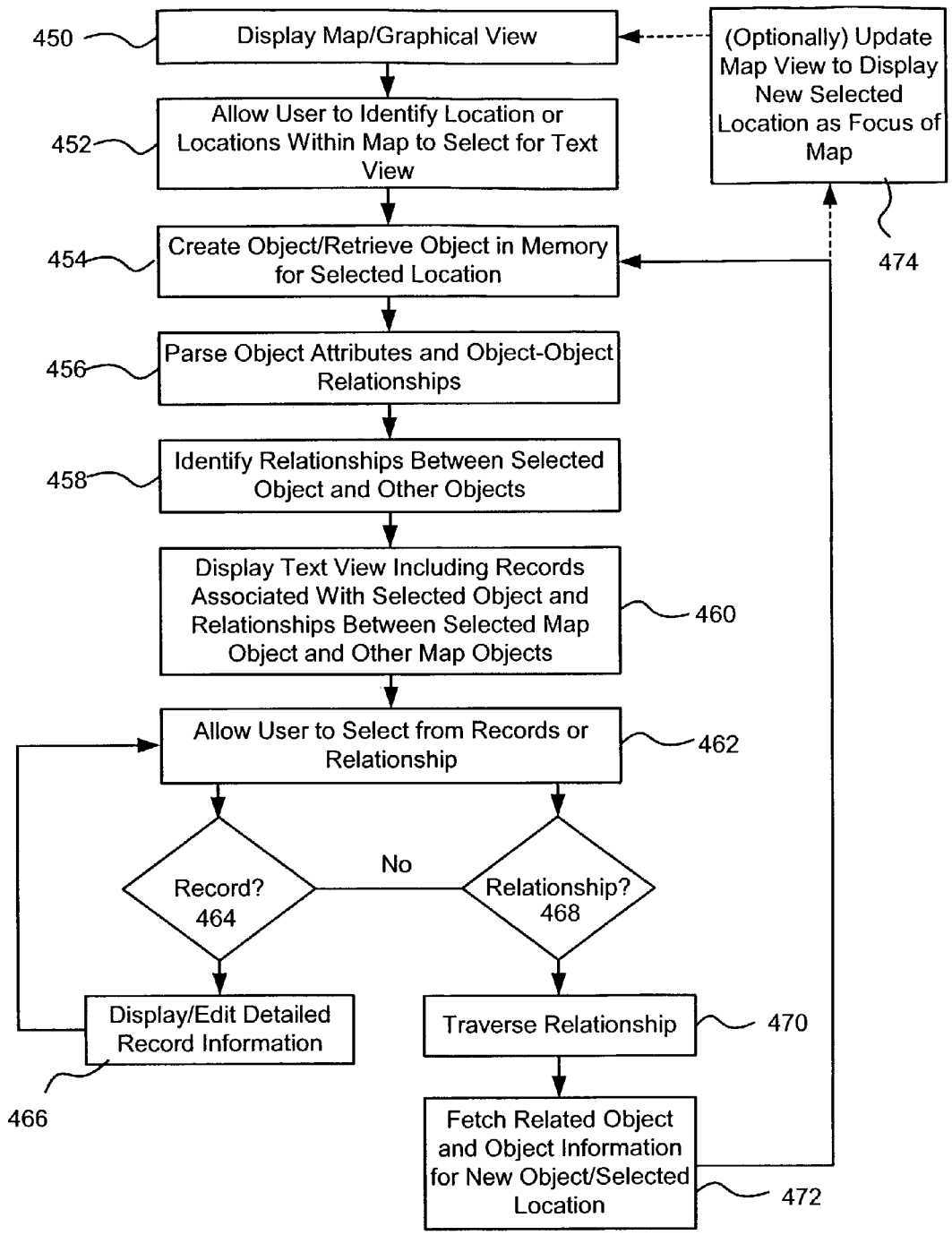
FIG. 11 illustrates a process in accordance with an embodiment of the invention that it allows a system, such as that shown in FIG. 10, to interpret relationships in a map or other type of topographical data, wherein the map items are linked by semantic relationships.

FIG. 11 illustrates a process in accordance with an embodiment of the invention that allows a system, such as that shown in FIG. 10, to interpret relationships in a map or other type of topographical data, wherein the map items are linked by semantic relationships. As shown in FIG. 11, a first step 450 in the process is for the system to display a digital map, or a graphical view, such as a visual map or some other form of visual or topographical data. This system then allows a user or operator to identify, in step 452, either a single location (map item) or multiple locations (map items) within the graphical view or map for display within a text view window. In step 454, the selected map item is retrieved and stored in memory as a software object corresponding to the physical location on the map, or the selected map item information. The system then, in step 456, parses the object in memory to determine the record attributes, i.e., the values or parameters associated with the map item. In addition, any object-object relationships are parsed to determine the semantic relationships between the corresponding map items. These object-object relationships are typically in the form of pointers, which may be either one-way or more typically two-way pointers. The system uses these object-object or pointer relationships to determine siblings or other linked mapped items, and to allow the operator to quickly traverse from one item to another item using the relationships. In step 458, the identified relationships between the selected object and any other objects, (i.e. siblings) are noted by the system. In step 460, the text view window is displayed, or if it is already displayed on the user screen then it is updated or refreshed to display records associated with the selected object, and relationships between the selected map item and any other map items that are semantically linked. In step 462, the user is allowed to select from any of these records within the text view window, or from any of the relationships also shown in the text view window. If the user or operator selects a record 464 that identifies a particular value or parameter associated with a map object, then this record information is displayed 466 to allow the user to edit or to view the field information. If however, the user selects a field from the record that provides a link to another map item, the system determines, in step 468, that a relationship exists between the two map items or more precisely between the two objects representing those map items. The relationship is traversed (using pointers) in step 470 to allow the system to fetch the related object and the related record for the new map item. This information is used to create or retrieve an object in memory for the new selected item, in step 472, and the process continues thereafter as before.

An optional step 474 allows the system to update the map view to display the new selected item locations, i.e., to alter the map or graphical view to focus on the selected item, or to display the newly selected item using, for example, a different color or highlight for the item.

Alternative Embodiments

Figure 12:
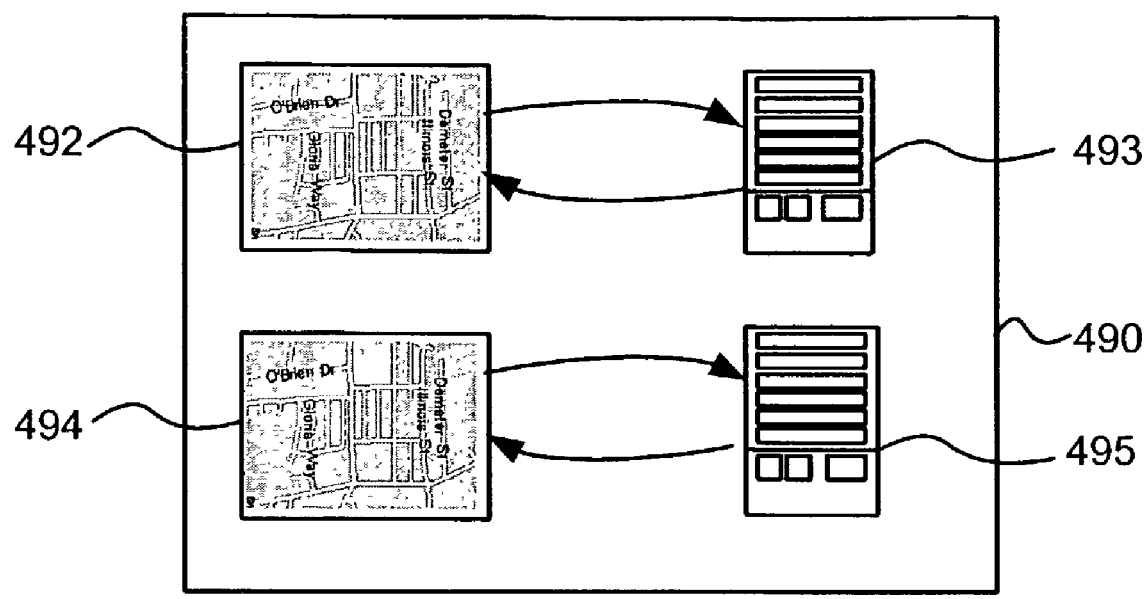
FIG. 12 shows one embodiment of the invention in which multiple graphical view windows and multiple text view windows are used to provide an environment in which the user or operator can manipulate or display many maps at the same time.

FIG. 12 shows one embodiment of the invention in which multiple graphical view windows and multiple text view windows are used to provide an environment in which the user or operator can manipulate or display many maps at the same time. The mechanism used to traverse between map items and map item information either from the graphical or text view windows are the same as described above, as will be apparent to one skilled in the art. Having multiple graphical view and text view windows allows the operator to more easily compare maps, and to assist in the overall viewing debugging process.

Typical Use in Viewing or Editing Maps

In accordance with one embodiment of the invention, the map viewing feature can be integrated into, or used with, new or existing map viewer/editor applications. This section describes how the invention can be integrated into one example of a viewer application, and used therein to open a record dialog and show the text representations for each of the records displayed. It will be evident to one skilled in the art that embodiments of the invention can be used with other viewer applications and with other map formats than those illustrated below, and that the invention is not limited to the particular implementation shown and described hereunder. Particularly, while the Geographic Data File (GDF) map format (an industry standard map format) is used herein to assist in describing the features of the invention, other map formats may be used. The invention is flexible enough that it can be used with most map formats currently available today, and also with those yet to be developed.

Displaying Record Dialogs

GDF comes in three different record formats: ASCII Sequential (AS), which is part of the industry standard format; ASCII Relational (AR); and Informix Relational (IR). The latter two formats are not part of the current industry standard for GDF. Before we display the record dialogs, we'll put the map back into geometry mode. In this example the operator clicks the "GDF" menu and select "Mode", then "Geometry". To display the geometry records, we must first go to select mode. Open the "View" menu and select "Select", "By Mouse Click".

Figure 13:
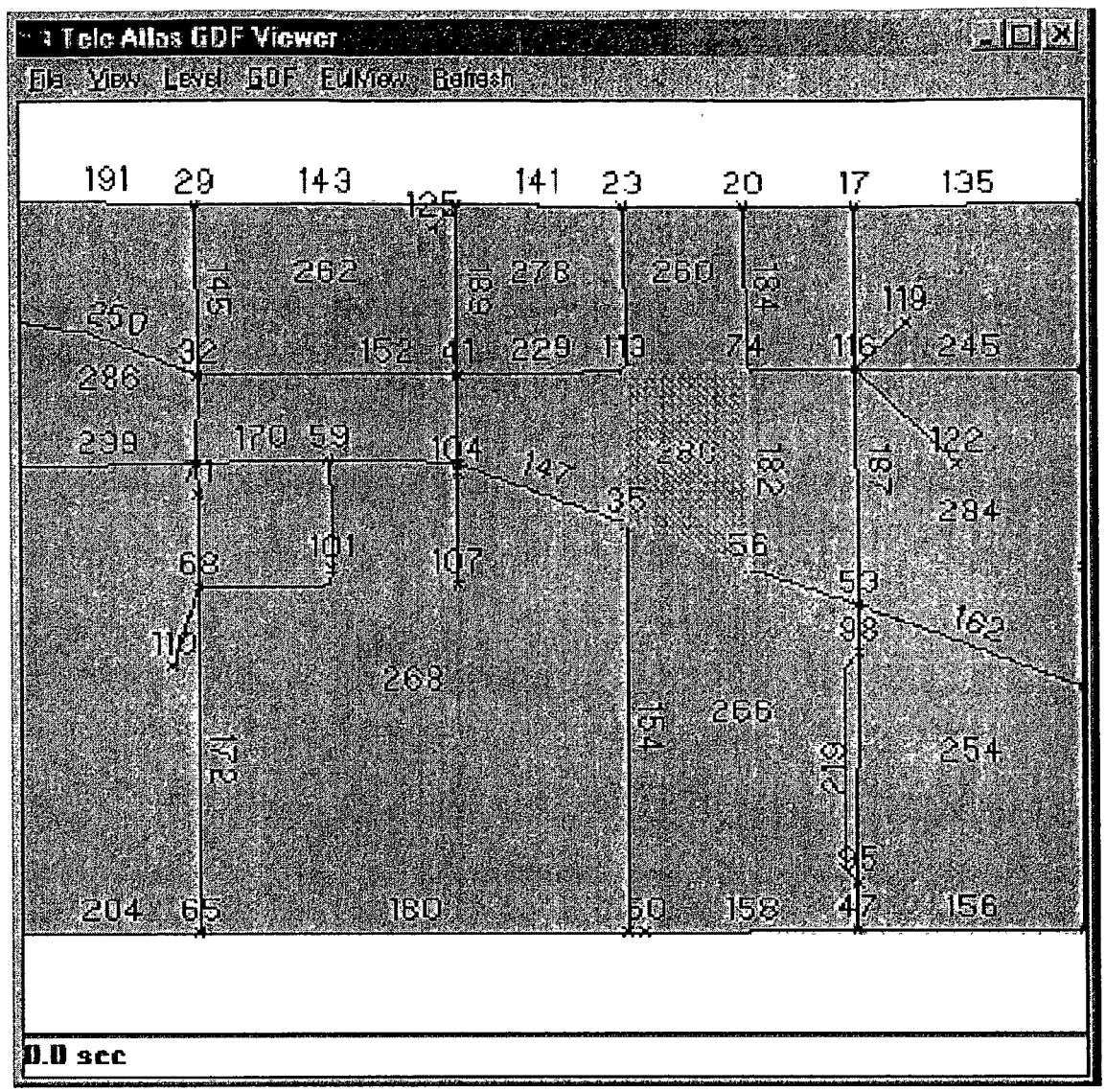

In selection mode, as illustrated in FIG. 13, single-clicking the mouse highlights the object you click. Single-clicking again, selects an adjacent object. Double-clicking an object opens the record dialog for that object, as shown for example in FIG. 14, and highlights it on the map. You can also display an object's record dialog by opening the "View" menu and selecting Item "Details". In the example shown in FIG. 14, the FACE_ID value, 280, is also the value displayed in the center of this face on the map shown in FIG. 13.

Navigating Record Dialogs

Figure 15:
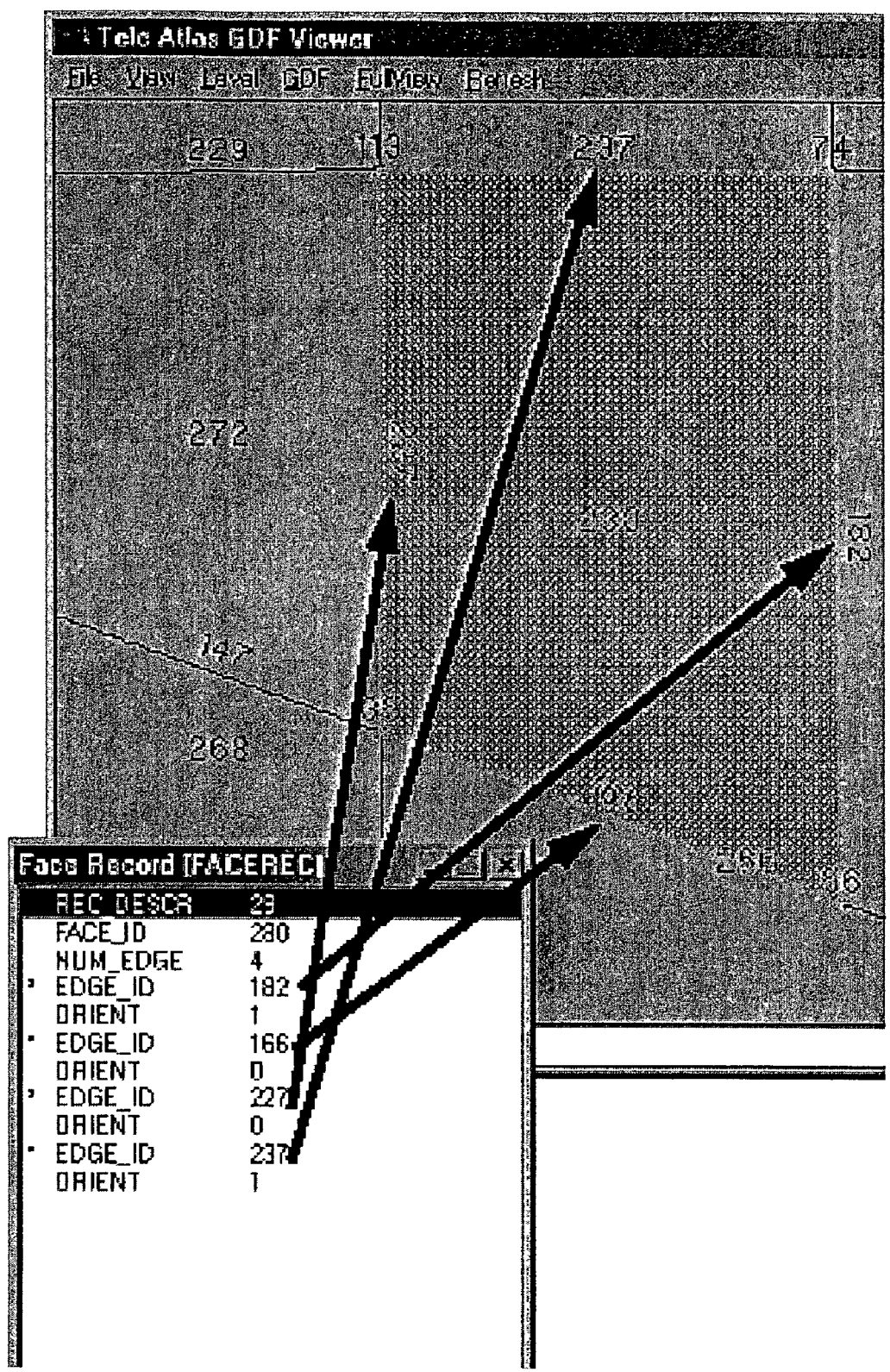

From the screen shot shown in FIG. 14, you can see that the list has two columns: the field name on the left and the value of that field on the right. Note that the very first field, REC_DESCR identifies the record type (e.g., face, edge, knot, etc.) for this record in the GDF file. Also, all four of the EDGE_ID fields in the list have corresponding ID numbers for the edges on the map. The screen shot shown in FIG. 15 shows the map panned and zoomed to reveal more detail.

Asterisked Fields

The asterisked field names in the list refer to other records that correspond to those fields. For example, EDGE_ID 182 from the face record shown in FIG. 15 refers to the corresponding Edge Record shown in FIG. 16.

Prev Button

The Prev button (short for "previous") displays the record immediately above the current record in the GDF file.

Next Button

The Next button moves to the record immediately after the current record.

Back Button

Although not shown here, the Back button, when provided, moves to the "cousin" record that preceded the current record.

GDF Record Structure—Record Categories

In this example, the "GDF" menu has three mode selections: "Geometry", "Simple" "Feature", and "Complex Feature". The GDF viewing mode directly corresponds to the three record categories:

Level 0—Geometry: shows the shape, length, layout, and location of geometric objects including: . knots; . edges; and . faces.

Level 1—Simple Features: interprets the geometric objects into map features. In other words, the simple features specify how the points, lines, and areas represent real world objects. For example: a point can be a street intersection or landmark. Similarly, a line represents different types of road elements such as freeways and residential streets. Simple features include: . point features; . line features; and . area features.

Level 2—Complex Features: combines one or more simple features to create a single larger feature.

Coordinate Records

The most basic component is the coordinate record. It specifies the exact geographical location of any geometric entity as well as internal shape points and includes the following fields:

REC_DESCR: All coordinate [XYZREC] records are type 23.

XYZ_ID: The unique ID of this record within this record section.

G_TYPE: Geometry Type Code (typically blank).

Q_PLAN: Quality Code (typically blank).

DESC_ID: Source Description Identifier: the ID number of the source document where the information of this record has been derived (typically blank).

NUM_COORD: The field counter that specifies how many times the next group of fields repeat.

X_COORD: The longitude of a point.

Y_COORD: The latitude of a point.

Z_COORD: The elevation of a point.

Level 0—Geometry—Knot Records

Figure 17:
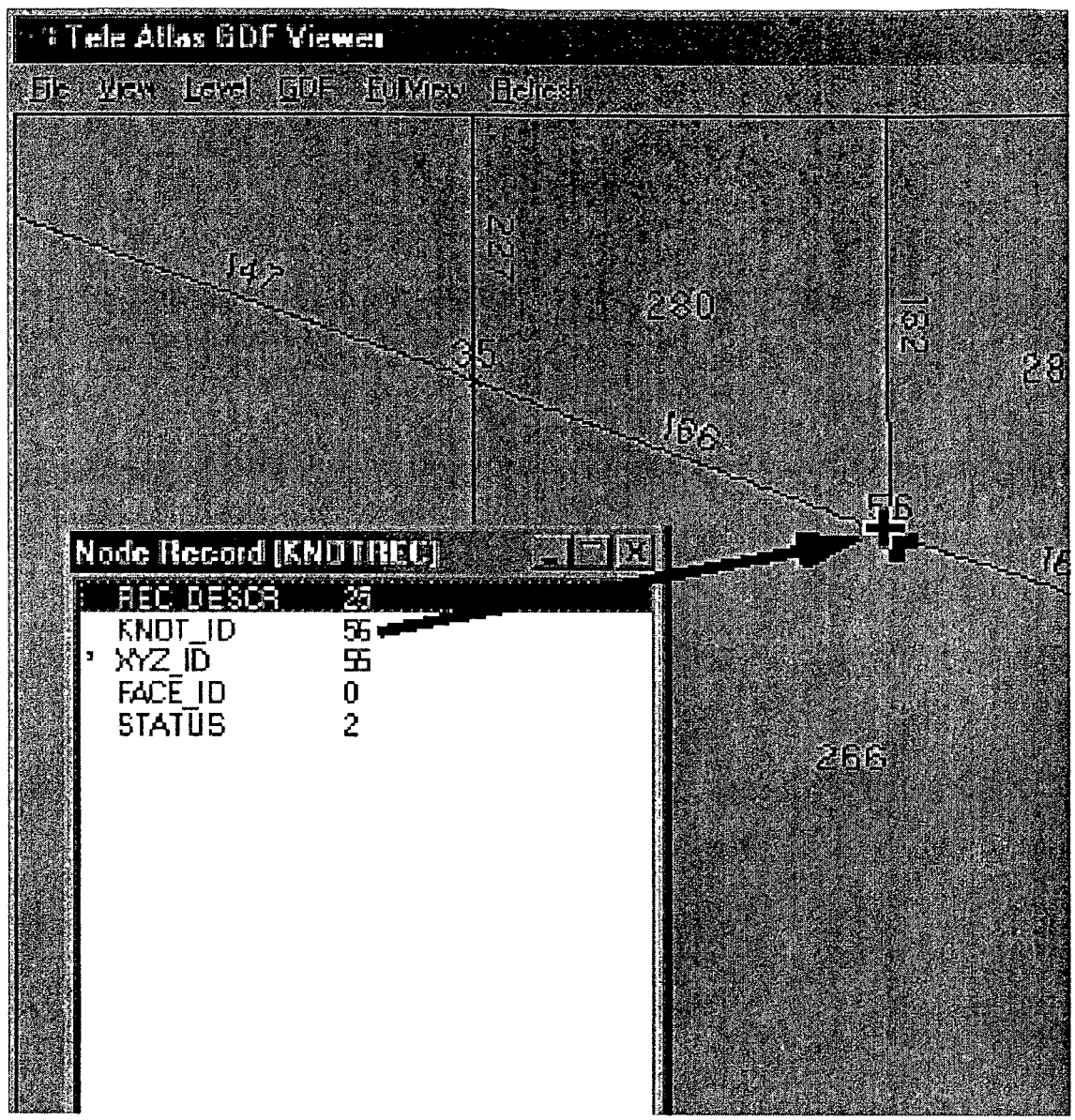

Knot records, shown for example in FIG. 17, represent 0-dimensional geometric entities (the building blocks of point features) and contain of the following:

REC_DESCR: All knot [KNOTREC] records are type 25.

KNOT_ID: The unique ID number for this knot in this section.

XYZ_ID: The record that provides the x, y, and z coordinates for this knot.

FACE_ID: The ID number of the face containing this knot if it is not on an edge.

STATUS: The type of knot this represents (1=section border node, only present for sectioning purposes, 2=normal node, 3=dataset border node, 4=end of stubble, and 5=section border node, present for reasons other than sectioning).

Edge Records

Figure 18:
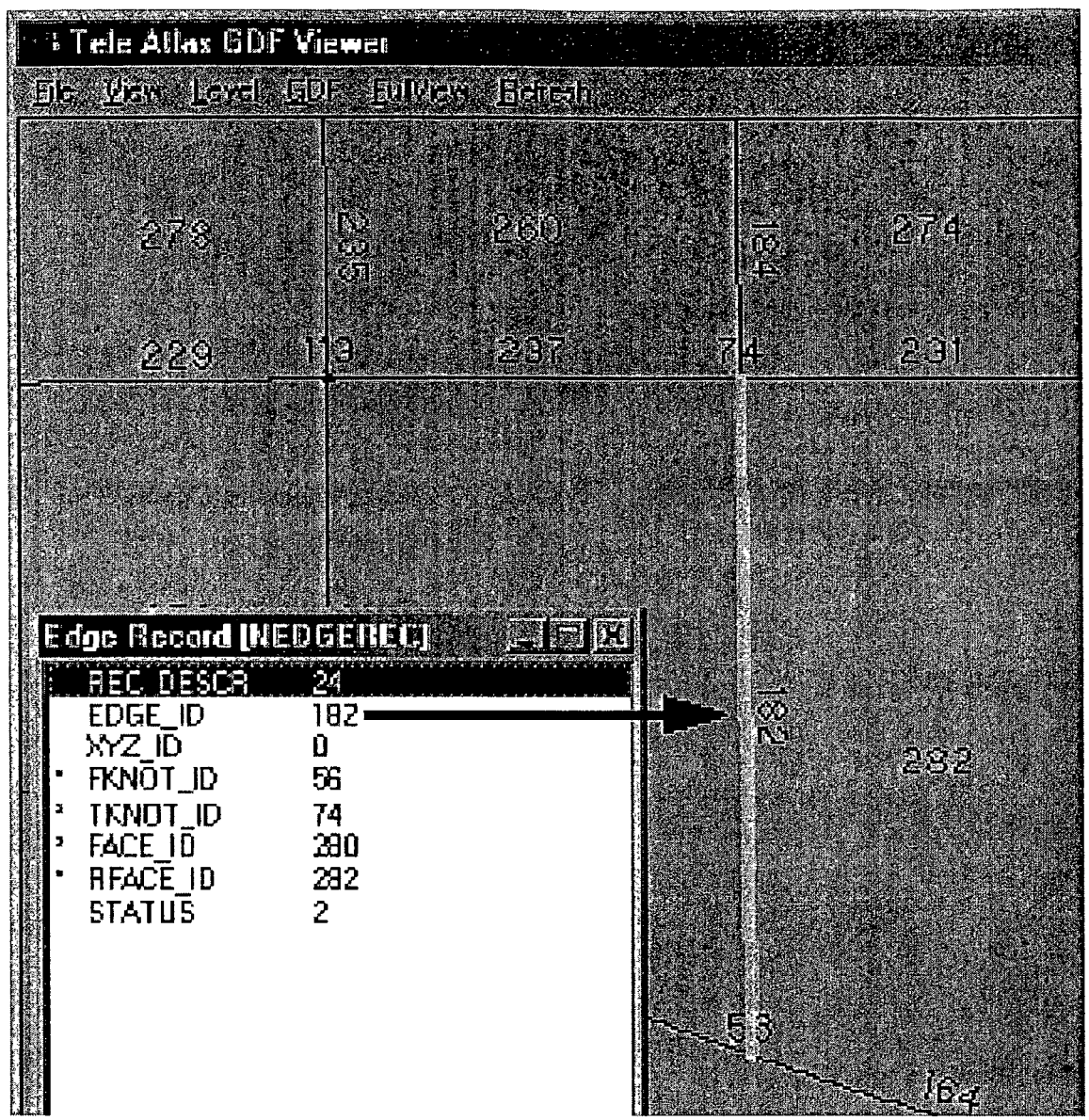

Edge records, shown for example in FIG. 18, represent one-dimensional geometric entities (the building blocks of line features) and contain of the following:

REC_DESCR: All edge [NEDGEREC] records are type 24.

EDGE_ID: The unique ID number of this edge in this section.

XYZ_ID: The ID number of the coordinate record that represents the coordinates of the intermediate shape point of this edge.
FKNOT_ID: The record that describes the from knot.
TKNOT_ID: The record that describes the to knot.
FACE_ID: The record that describes the face on the left side of the edge.
RFACE_ID: The record that describes the face on the right side of the edge.
STATUS: The type of edge this represents (1=not applicable, 2=normal edge, 3=dataset border edge, 4=not applicable, and 5=non-section border edge).

Face Records

Figure 19:
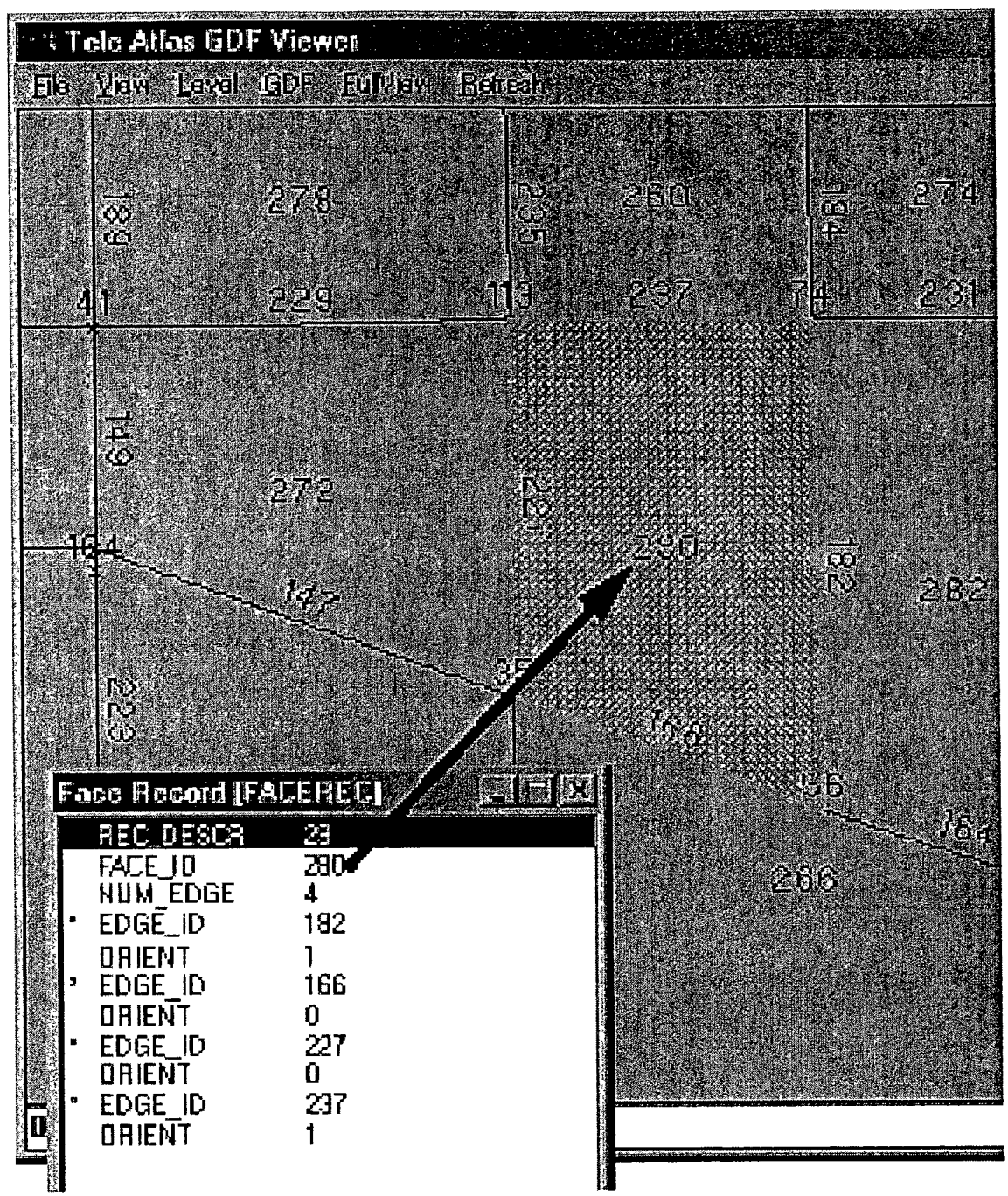

Face records, shown for example in FIG. 19, represent two-dimensional entities (the building blocks of area features) and contain the following:
REC_DESCR: All face [FACEREC] records are type 29.
FACE_ID: The unique ID number of this face within this section.
NUM_EDGE: The number of edges that make up this face and the number of times the next two fields repeat.
EDGE_ID: The edge records that border this face.
ORIENT: This value determines whether the orientation of the edge's direction is clockwise (0) or counter-clockwise (1) relative to the face.

Level 1—Simple Features—Point Feature Records

Figure 20:
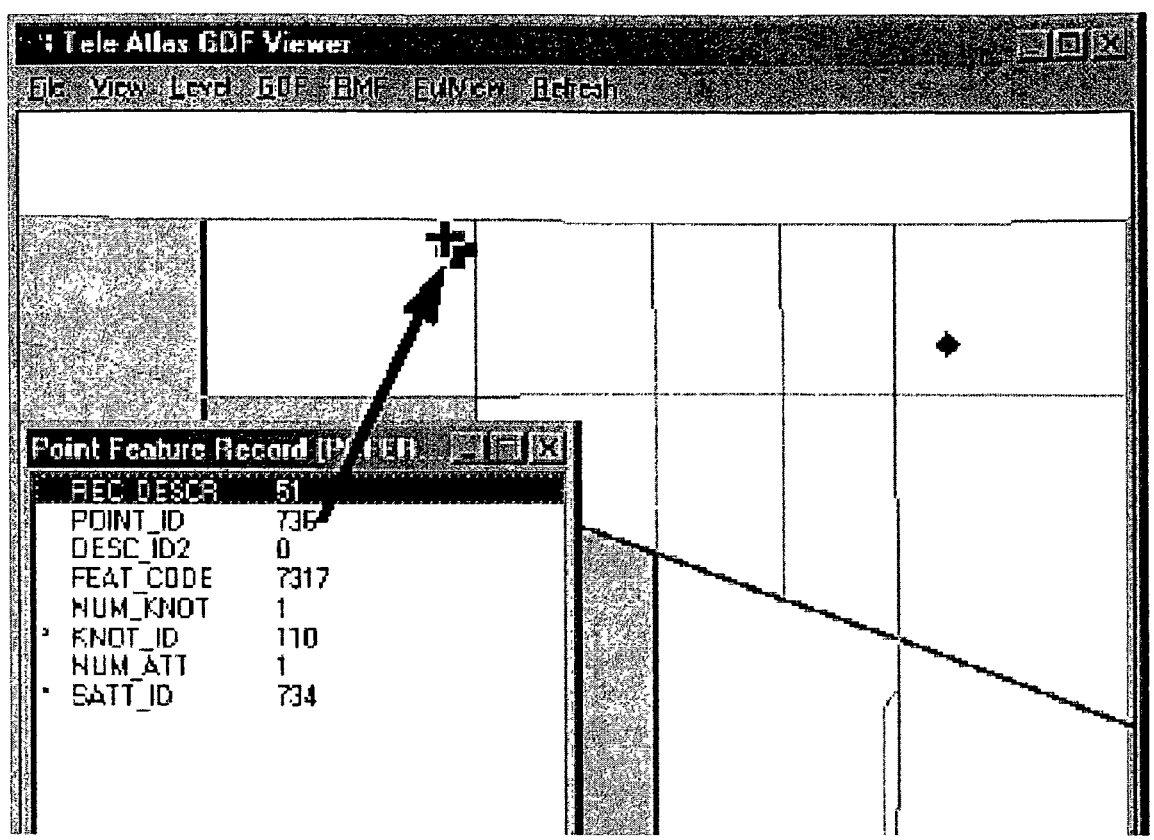

Point feature records, shown for example in FIG. 20, represent real world point features on the map (like road junctions and landmarks) and contain the following:
REC_DESCR: All point [POFEREC] records are type 51.
POINT_ID: The unique identifier for this record in this section.
DESCR_ID: Source Description Identifier (always blank).
FEAT_CODE: Feature Class Code: the code of the feature class to which the feature belongs.
NUM_KNOT: The field counter that specifies how many times the next field repeats (always 1).
KNOT_ID: Node Identifier: the ID number of the knot that contains the geometry information for this point.
NUM_ATT: The field counter that specifies how many times the next field repeats.
SATT_ID: Segmented Attribute Record Identifier: the ID number of a [DSATREC] record that contains attribute information for this feature.

Line Feature Records

Figure 21:
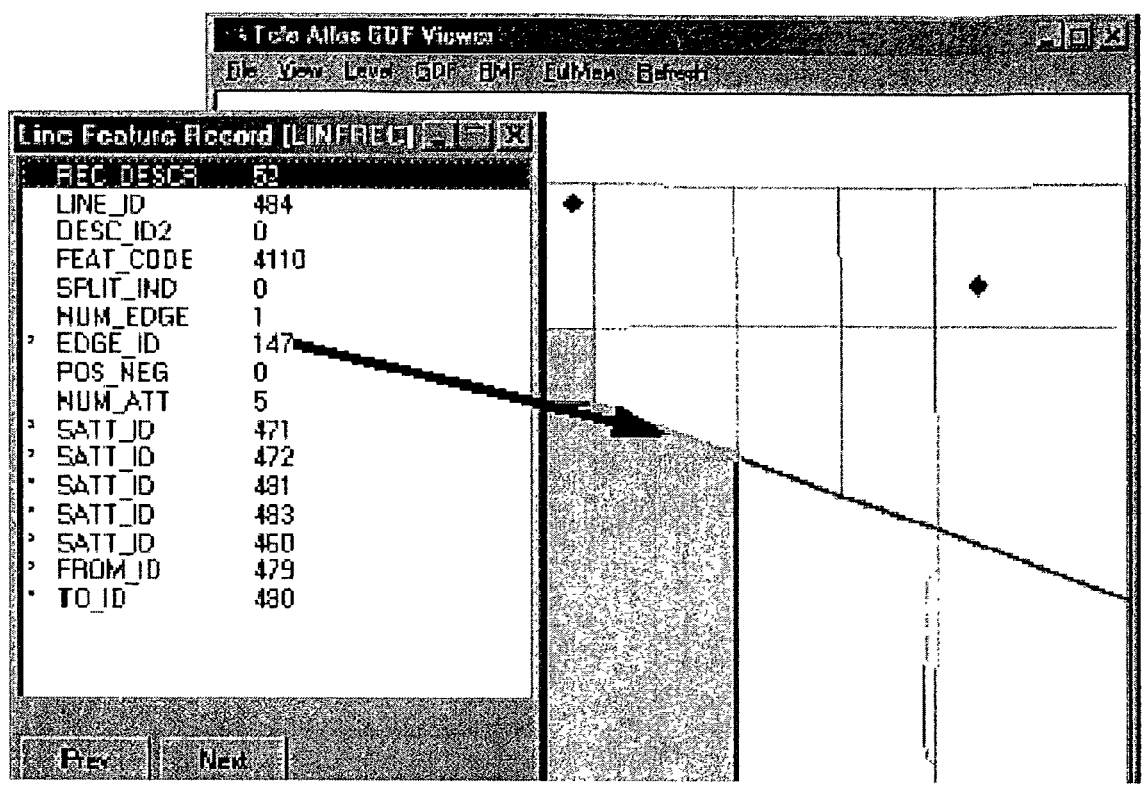

Line feature records, shown for example in FIG. 21, represent real world linear features on the map like the different classes of road elements, bridges, tunnels, railroads, walkways, shorelines, and political boundaries such as state and county borders. Line feature records contain the following:
REC_DESCR: All line [LINFREC] records are type 52.
LINE_ID: The unique ID number of the line in this section.
DESC_ID: Source Description Identifier (always blank).
FEAT_CODE: Feature Class Code: the code of the feature class to which the line belongs.
SPLIT_IND: Feature Split Indicator: (0=whole feature; 1=partial feature).
NUM_EDGE: Specifies how many times the next two fields repeat.
EDGE_ID: The ID of an edge record that contains the geometry information for this line feature.
POS_NEG: Indicates the direction of the line relative to the edge.
NUM_ATT: Specifies how many times the next field repeats.
SATT_ID: The ID of a [DSATREC] that contains an attribute for this feature.
FROM_ID: The record ID of the first bordering point feature.
TO_ID: The record ID of the second bordering point feature.

Area Feature Records

Figure 22:
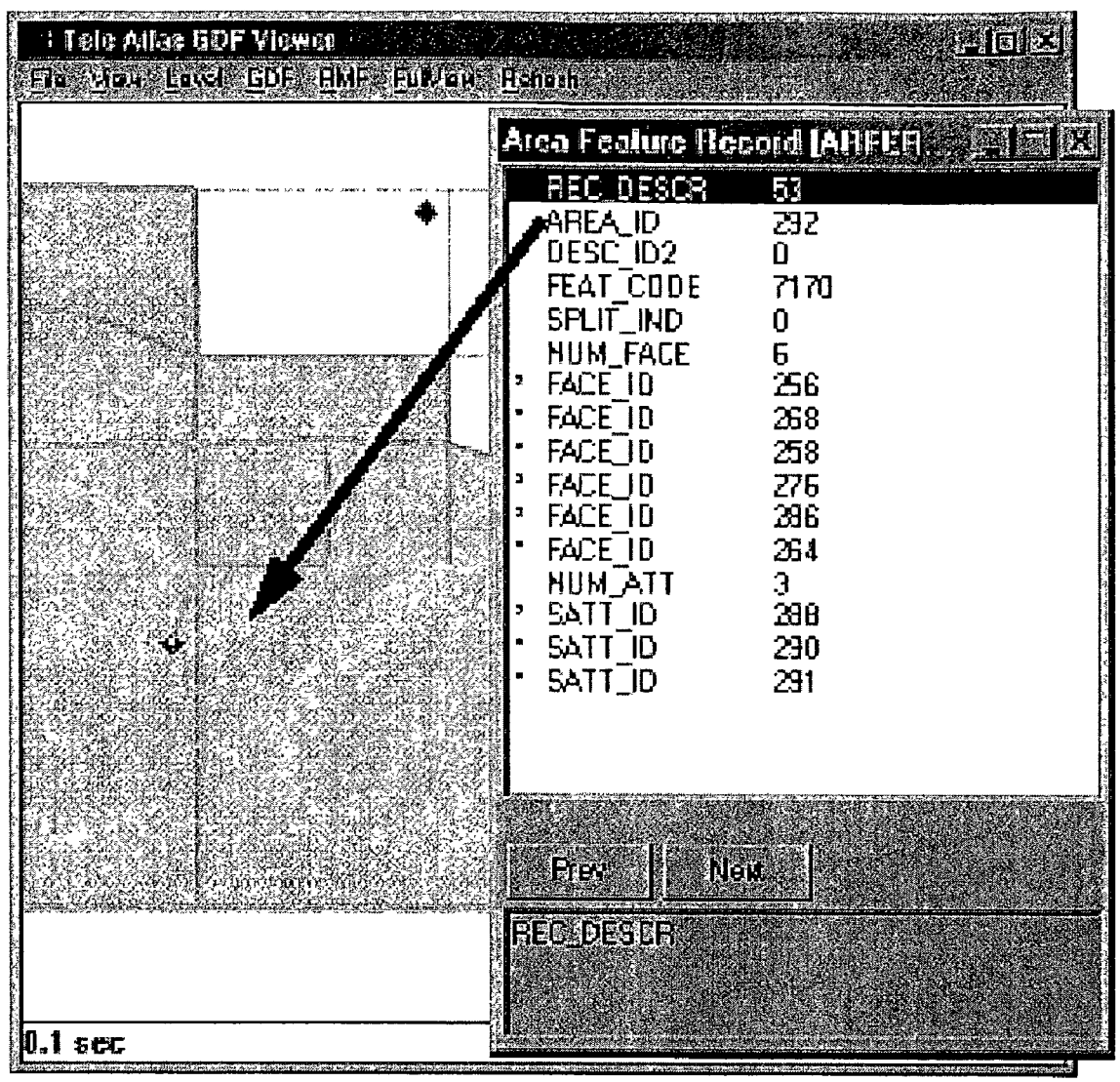

Area feature records, shown for example in FIG. 22, represent real world area features on the map like parks and water bodies and contain the following:
REC_DESCR: All line [ARFEREC] records are type 53.
AREA_ID: The unique ID number of the area in this section.
DESC_ID: Source Description Identifier (always blank).
FEAT_CODE: Feature Class Code: the code of the feature class to which this feature belongs.
SPLIT_IND: Split Indicator: (0=whole feature; 1=partial feature).
NUM_FACE: Specifies how many times the next field repeats.
FACE_ID: The ID of a face that is a component of this area.
NUM_ATT: Specifies how many times the next field repeats.
SATT_ID: Segmented Attribute Record: the ID number of a [DSATREC] record that contains attribute information for this area feature.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to capturing and annotating media streams, producing a timeline of significant note-taking events, linking still frames to points in or segments of a media stream, recognize any slide changes, production and distribution of meta data describing at least a part of a media stream, and communication of results according to the processes of the present invention.

As used herein, a given signal, event or value is "responsive" or "in response to" a predecessor signal, event or value if the predecessor signal, event or value influenced the given signal, event or value. If there is an intervening processing element, step or time period, the given signal, event or value can still be "responsive" to the predecessor signal, event or value. If the intervening processing element or step combines more than one signal, event or value, the signal output of the processing element or step is considered "responsive" to each of the signal, event or value inputs. If the given signal, event or value is the same as the predecessor signal, event or value, this is merely a degenerate case in which the given signal, event or value is still considered to be "responsive" to the predecessor signal, event or value. "Dependency" of a given signal, event or value upon another signal, event or value is defined similarly. The present invention may be conveniently implemented using a conventional general purpose or a specialized digital computer or microprocessor programmed according to the teachings of the present disclosure, as will be apparent to those skilled in the computer art.

The foregoing description of the present invention has been provided for the purposes of illustration and description. It is not intended to be exhaustive or to limit the invention to the precise forms disclosed. Many modifications and variations will be apparent to the practitioner skilled in the art. Particularly, it will be evident that the above described viewer and editor features can be incorporated into other types of software application beyond those described, and that a wide variety of map formats may be viewed and manipulated with the invention, in addition to the GDF format described herein. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for map visualization and manipulation, comprising:
    a display device;
    a database of map information corresponding to a map, that includes a plurality of map items of different map item types, each map item having attributes associated therewith, wherein one or more of the attributes of a first map item and the attributes of a second or other map items are linked with a semantic link that identifies both the link between the first and second or other map items, and their relationship;
    a graphical window, displayed on said display device, that displays an illustration of the map, wherein at least one of the first or second map items may be selected by an operator;
    a text window, displayed on said display device, that automatically updates to display the attributes for a currently selected map item, and visibly denotes those attributes of the currently selected map item that include a semantic link to another map item; and
    wherein said operator can navigate between related map items by selecting one of the attributes in the text window that includes a semantic link, wherein the system recognizes the selection of an attribute having a semantic link, and, automatically traverses the semantic link to the related map item and makes the related map item the currently selected map item,
    updates the graphical window accordingly, and
    displays the attributes for the currently selected map item in the text window.

2. The system of claim 1 further including:
    a selection device for allowing an operator to select a map item from said map, or any of the attributes within the text record; and,
    wherein in response to said selection of said map item or of said attribute, the semantic link is traversed to retrieve record information about the second map item and/or to redraw the map to focus on the second map item.

3. The system of claim 2 wherein said traversal of a semantic link in response to selection of a map item or attribute includes fetching information about the second item or redrawing the map to focus on the second item.

4. The system of claim 3 wherein said step of fetching includes translating the fetch command into a format suitable for use with the map format used.

5. The system of claim 2 wherein the text window includes a next button and a previous button, to allow the operator to follow successive links between items of the same type, and a back button to allow the operator to retrace links to map items of different type.

6. The system of claim 5 wherein the links between map items are represented by pointers from one map element to another map element, and wherein the successive links are the pointers used to link to next map items.

7. The system of claim 1 wherein the map has a map format which defines the hierarchy of items and their links, and which hierarchy is used by the system to define the semantic links between the map items.

8. The system of claim 1 wherein the map items are stored as objects in memory including fields and pointers associated with each object.

9. The system of claim 8 wherein the placement of the pointers are determined by analyzing the fields in the map format.

10. The system of claim 1 wherein the map or map items therein may be edited or updated by editing or updating the attributes in the text record.

11. A method of displaying map information, comprising the steps of:
    accessing a database of map information corresponding to a map, that includes a plurality of map items of different map item types, each map item having attributes associated therewith, wherein one or more of the attributes of a first map item and the attributes of a second or other map items are linked with a semantic link that identifies both the link between the first and second or other map items, and their relationship;
    displaying a graphical illustration of the map, wherein at least one of said first or second map items may be selected by an operator; and
    displaying, in a text window, the attributes associated with a currently selected map item, wherein said text window changes automatically to display the attributes of the map item currently selected, and graphically denotes by a visible identification, any attributes having semantic links that relate said first map item to said second map item, or to a third map item not currently displayed on the map;

enabling said operator to navigate between related map items by selecting one of the attributes in the text window that includes a semantic link, and, in response automatically traversing the semantic link to the related map item and makes the related map item the currently selected map item, updating the graphical illustration accordingly, and displaying the attributes for the currently selected map item in the text window.

12. The method of claim 11 wherein the map has a map format which defines the hierarchy of items and their links, and which hierarchy is used to define the links between the map items.

13. The method of claim 11 wherein the map items are stored as objects in memory including fields and pointers associated with each object.

14. The method of claim 13 wherein the placement of the pointers are determined by analyzing the fields in the map format.

15. The method of claim 11 wherein the text window includes a next button and a previous button, to allow the operator to follow successive links between items of the same type, and a back button to allow the operator to retrace links to map items of different type.

16. The method of claim 15 wherein the links between map items are represented by pointers from one map element to another map element, and wherein the successive links are the pointers used to link to next map items.

17. The method of claim 11 wherein the map or map items therein may be edited or updated by editing or updating the attributes in the text record.

18. A system for map visualization and manipulation, comprising:

a database of map information corresponding to a map, that includes a plurality of different map items of different map item types, each map item having attributes associated therewith, wherein the first map item can be linked to a plurality of other map items with semantic links that identify the relationships between the different map items and different map item types;

a logic for displaying a graphical window on a display device, wherein the graphic window displays an illustration of the map including the map items;

a logic for displaying a text window on the display device, wherein the text window is automatically updated upon selecting a map item to display the attributes for a currently selected map item, and visibly denote those attributes of the currently selected map item that include semantic links to other map items; and wherein an operator can navigate between related map items by selecting one of the attributes in the text window that includes a semantic link, whereupon on selection of the attribute the system automatically traverses the semantic link to the related map item and makes the related map item the currently selected map item, updates the graphical window accordingly, and displays the attributes for the currently selected map item in the text window.

19. The system of claim 18, wherein the graphical window and the text window are updated simultaneously upon selecting a map item, to allow parallel navigation of map items by the operator either from the graphical window or the text window.

20. The system of claim 18, wherein at least some of the attributes displayed in the text window for the currently selected map item are hidden from display on the map.

21. The system of claim 18, wherein a particular currently selected map item can link to a plurality of other map items, and wherein for the particular currently selected map item the text window is automatically updated upon selecting the map item to visibly denote the plurality of attributes that include semantic links to the plurality of other map items.

22. The system of claim 18, wherein the semantic links can be either of intra-type links between similar map item type and inter-type links between different map item types.

23. The system of claim 18, wherein the attributes for a particular currently selected map item as displayed in the text window can be edited by the operator, and subsequently saved, to make a change to the attributes for that map item as stored in the database.

24. A method of displaying map information, comprising the steps of:

accessing a database of map information corresponding to a map, that includes a plurality of different map items of different map item types, each map item having attributes associated therewith, wherein the first map item can be linked to a plurality of other map items with semantic links that identify the relationships between the different map items and different map item types;

displaying a graphical window on a display device, wherein the graphic window displays an illustration of the map including the map items;

displaying a text window on the display device, wherein the text window is automatically updated upon selecting a map item to display the attributes for a currently selected map item, and visibly denote those attributes of the currently selected map item that include semantic links to other map items; and receiving input to navigate between related map items including selecting one of the attributes in the text window that includes a semantic link, whereupon on selection of the attribute automatically traversing the semantic link to the related map item and make the related map item the currently selected map item, update the graphical window accordingly, and display the attributes for the currently selected map item in the text window.

25. The method of claim 24, further comprising updating the graphical window and the text window simultaneously upon selecting a map item, to allow parallel navigation of map items by the operator either from the graphical window or the text window.

26. The method of claim 24, wherein at least some of the attributes displayed in the text window for the currently selected map item are hidden from display on the map.

27. The method of claim 24, wherein a particular currently selected map item can link to a plurality of other map items, and wherein for the particular currently selected map item the text window is automatically updated upon selecting the map item to visibly denote the plurality of attributes that include semantic links to the plurality of other map items.

28. The method of claim 24, wherein the semantic links can be either of intra-type links between similar map item type and inter-type links between different map item types.

29. The method of claim 24, further comprising allowing the attributes for a particular currently selected map item as displayed in the text window to be edited, and subsequently saved, to make a change to the attributes for that map item as stored in the database.

* * * * *